United States Patent
Kazama et al.

(10) Patent No.: US 10,860,225 B2
(45) Date of Patent: Dec. 8, 2020

(54) APPARATUS AND METHOD FOR ROUTING ACCESS BASED ON DEVICE LOAD

(71) Applicant: FUJITSU LIMITED, Kawasaki (JP)

(72) Inventors: Satoshi Kazama, Kawasaki (JP); Shinya Kuwamura, Kawasaki (JP); Eiji Yoshida, Yokohama (JP); Junji Ogawa, Montréal (CA)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/924,927

(22) Filed: Mar. 19, 2018

(65) Prior Publication Data
US 2018/0285012 A1 Oct. 4, 2018

(30) Foreign Application Priority Data
Mar. 30, 2017 (JP) .................. 2017-068585

(51) Int. Cl.
| | | |
|---|---|---|
| G06F 3/06 | (2006.01) | |
| G06F 13/16 | (2006.01) | |
| G06F 13/40 | (2006.01) | |
| G06F 13/42 | (2006.01) | |

(52) U.S. Cl.
CPC .......... *G06F 3/0631* (2013.01); *G06F 3/061* (2013.01); *G06F 3/065* (2013.01); *G06F 3/067* (2013.01); *G06F 3/0611* (2013.01); *G06F 3/0635* (2013.01); *G06F 3/0652* (2013.01); *G06F 3/0659* (2013.01); *G06F 3/0685* (2013.01); *G06F 13/1694* (2013.01); *G06F 13/4022* (2013.01); *G06F 13/4068* (2013.01); *G06F 13/4282* (2013.01); *G06F 2206/1012* (2013.01); *G06F 2213/0026* (2013.01)

(58) Field of Classification Search
CPC ...... G06F 3/0631; G06F 3/061; G06F 3/0635; G06F 3/067; G06F 3/0685
USPC .......................................... 711/154
See application file for complete search history.

(56) References Cited

U.S. PATENT DOCUMENTS

| | | | |
|---|---|---|---|
| 5,893,139 A | 4/1999 | Kamiyama | |
| 2004/0133707 A1* | 7/2004 | Yoshiya ................ | G06F 3/0659 710/6 |
| 2013/0212349 A1* | 8/2013 | Maruyama .............. | G06F 16/11 711/167 |

(Continued)

FOREIGN PATENT DOCUMENTS

| | | |
|---|---|---|
| JP | 9-44381 | 2/1997 |
| JP | 2013-164822 | 8/2013 |

OTHER PUBLICATIONS

Diamond Point International, "Violin Memory vRAID Flash RAID Overview", Nov. 2010, 16 pp.

(Continued)

*Primary Examiner* — Than Nguyen
(74) *Attorney, Agent, or Firm* — Staas and Halsey

(57) ABSTRACT

An information processing apparatus includes a memory and a processor and accesses a first storage device and a second storage device wherein an access speed of the second storage device is higher than an access speed of the first storage device. The memory stores information relating to a request in a request from the information processing apparatus to the second storage device. The processor, which is connected to the memory, determines a load on the second storage device based on the information relating to the request.

14 Claims, 32 Drawing Sheets

(56) References Cited

U.S. PATENT DOCUMENTS

2015/0278127 A1* 10/2015 Takakura ............ G06F 13/1642
711/168
2016/0359976 A1* 12/2016 Chatley ................ G06F 3/0613
2016/0371121 A1* 12/2016 Ozaki ..................... G06F 9/505

OTHER PUBLICATIONS

Japanese Office Action dated Oct. 6, 2020 for the corresponding Japanese application No. 2017-068585.

* cited by examiner

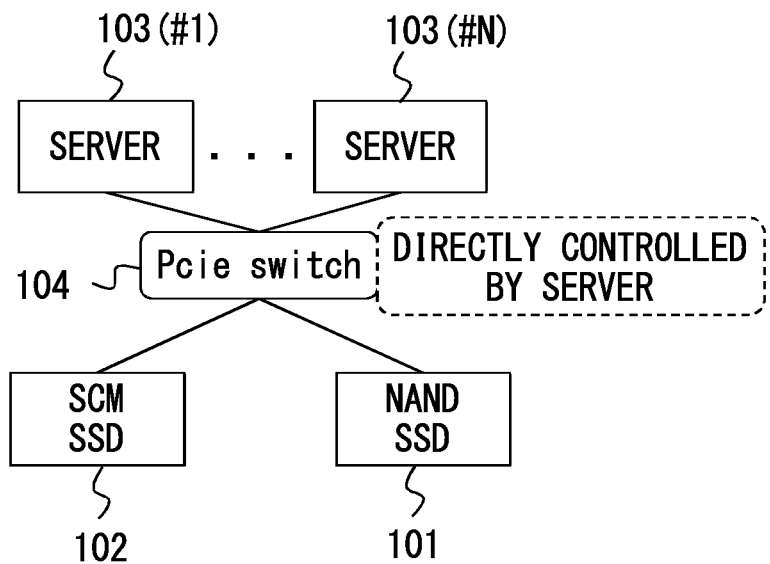
F I G. 1

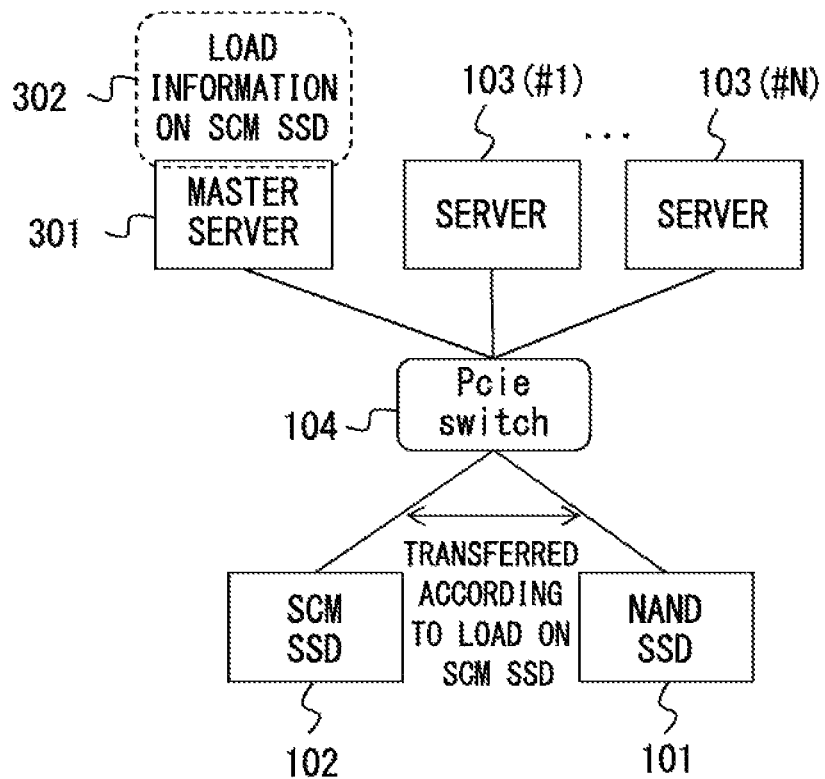
F I G. 3A
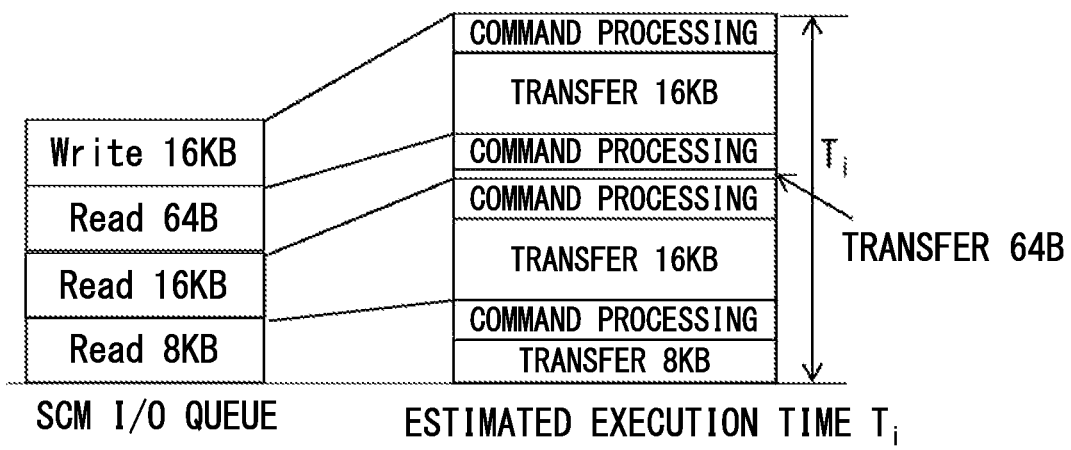
F I G. 3B

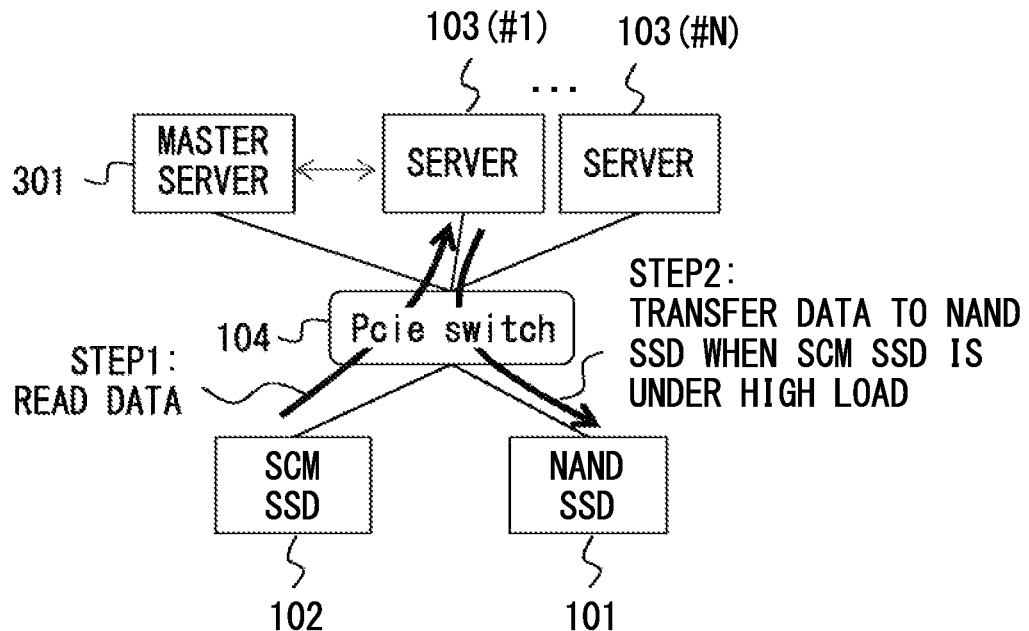
F I G. 4A
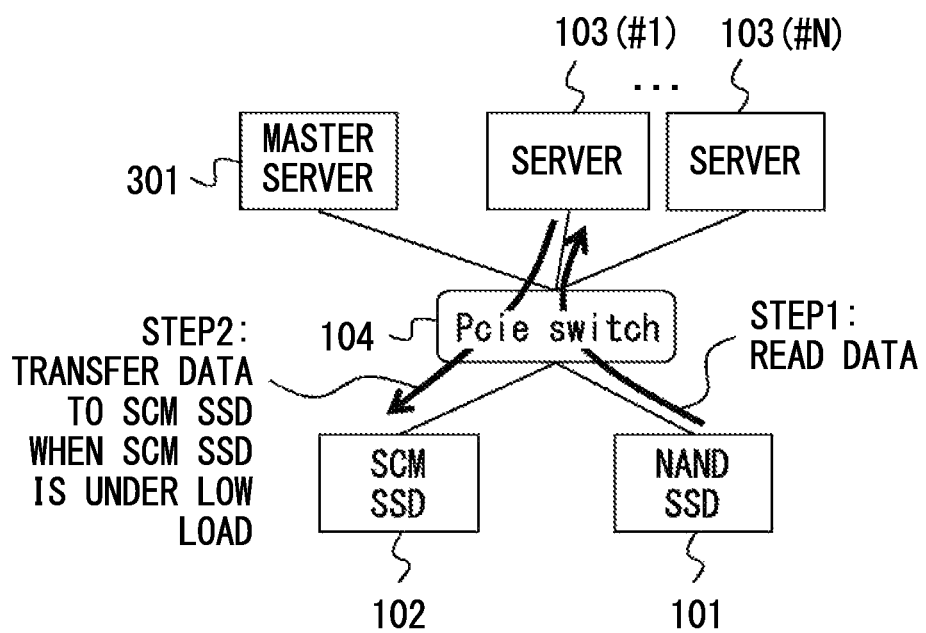
F I G. 4B

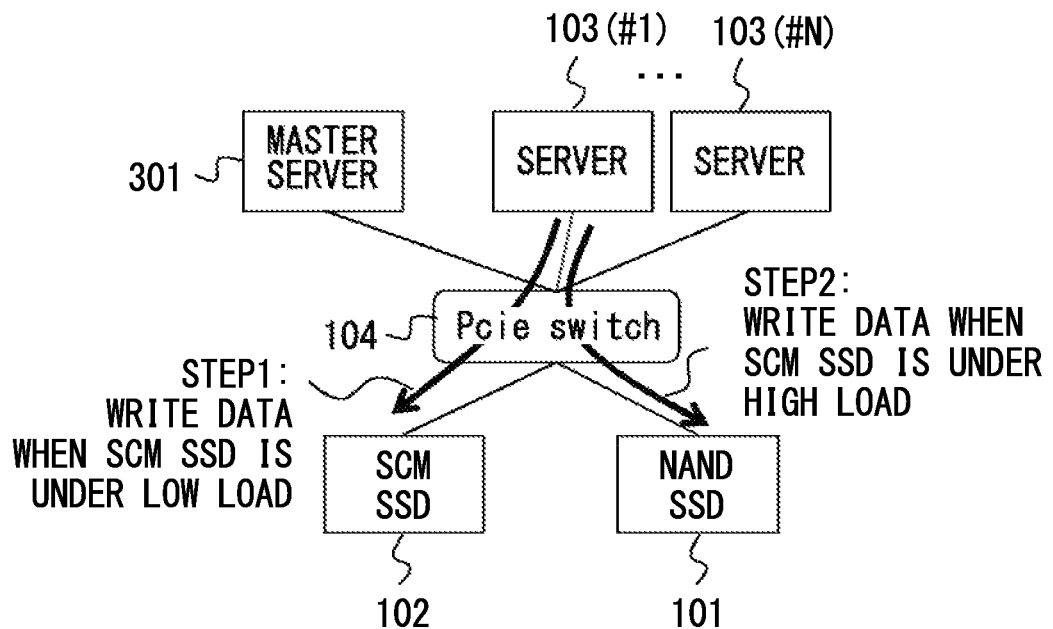
F I G. 5 A
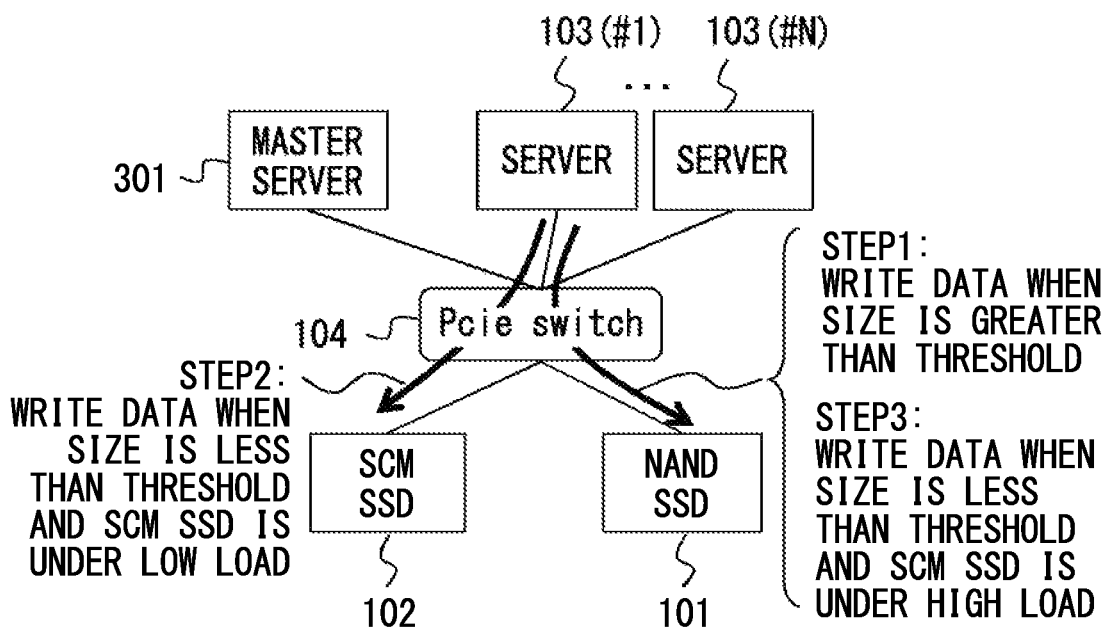
F I G. 5 B

| SERVER #1 LOAD INFORMATION $T_1$ | ... | SERVER #i LOAD INFORMATION $T_i$ | ... | SERVER #N LOAD INFORMATION $T_N$ | TOTAL LOAD INFORMATION | LOAD STATE |
|---|---|---|---|---|---|---|
| 30 μs | ... | 50 μs | ... | 100 μs | 180 μs | HIGH |

FIG. 10

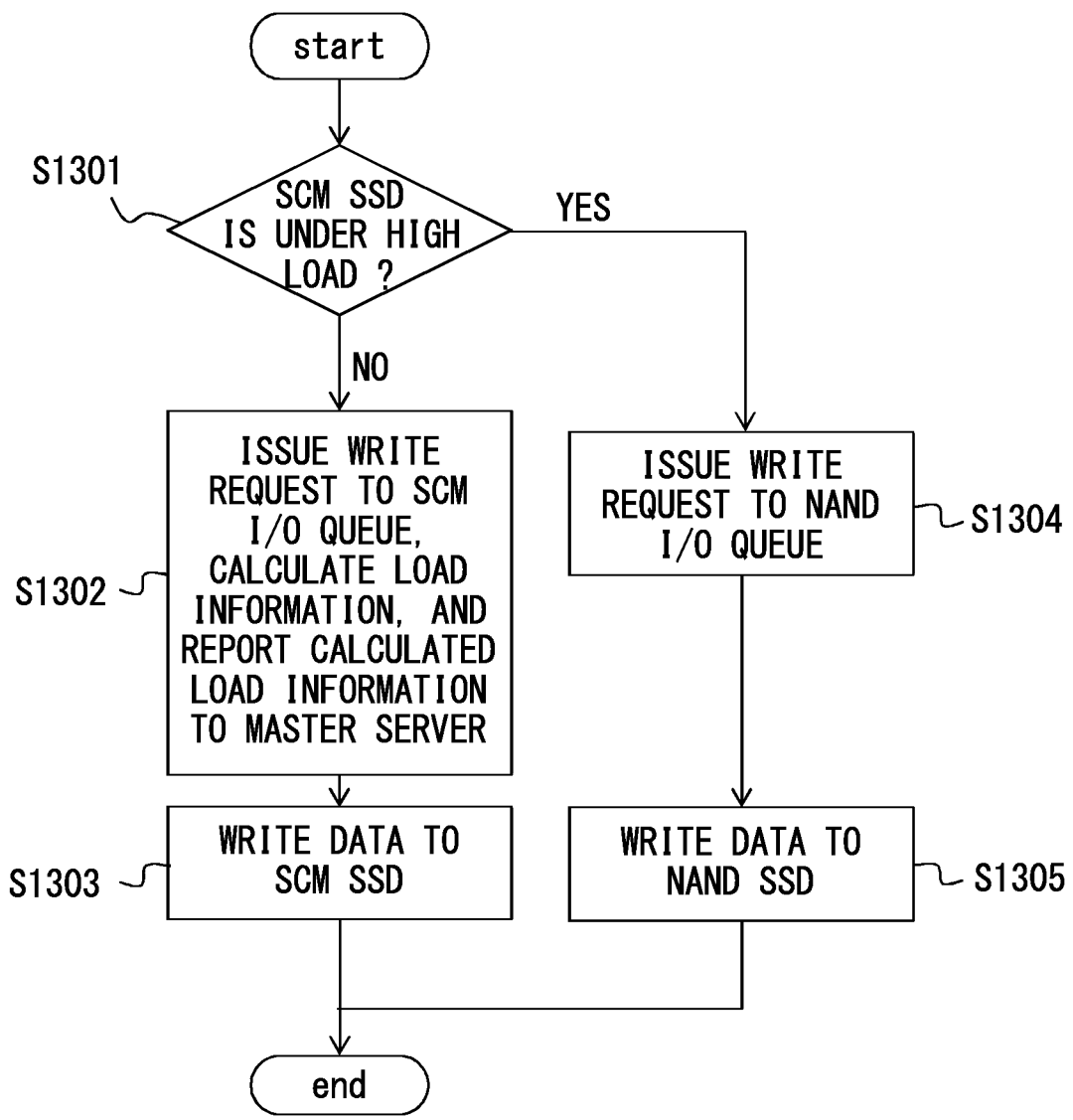
F I G. 13

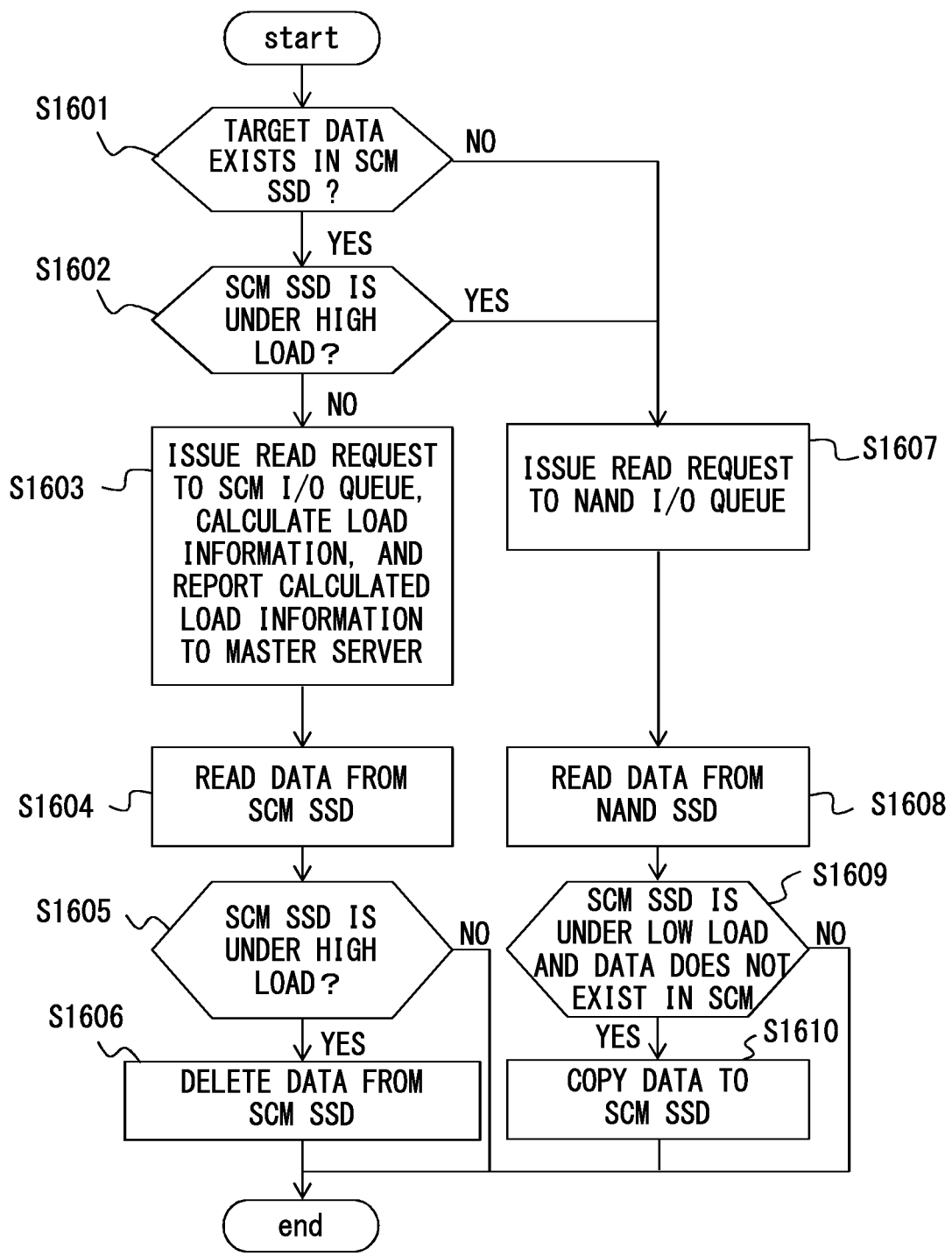
F I G. 1 6

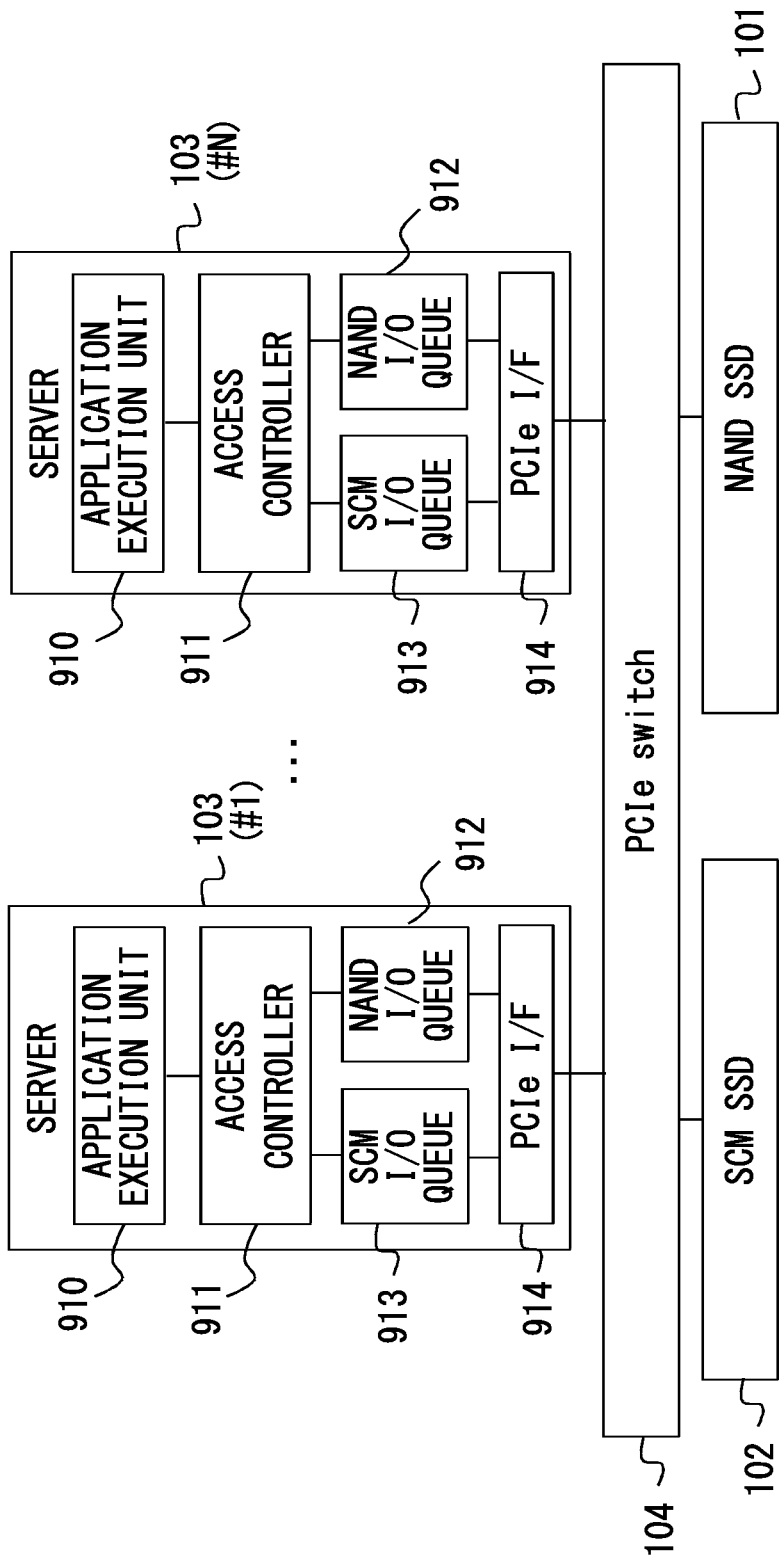
F I G. 18

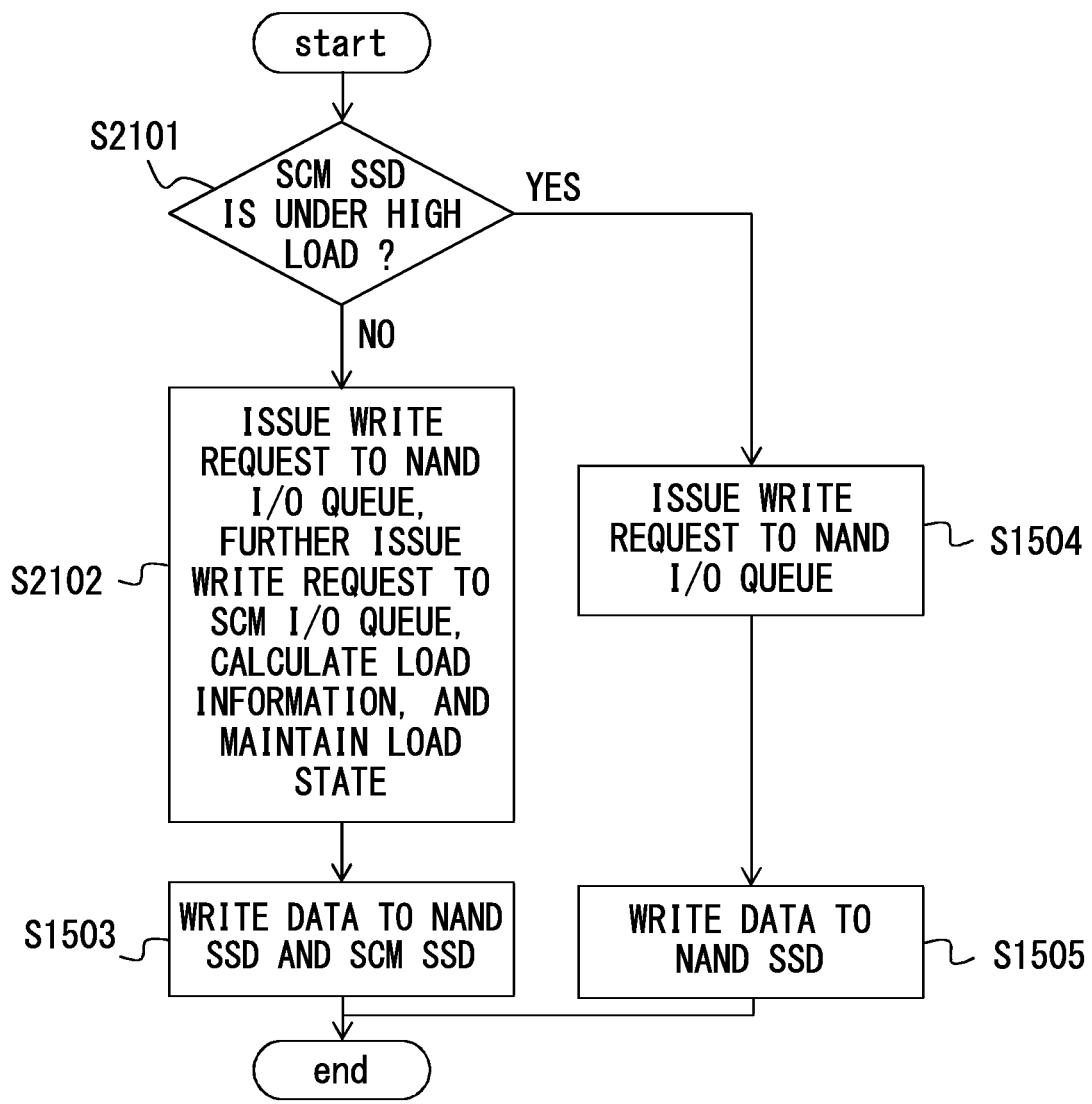
F I G. 2 1 ered from the HDD to the SSD.
APPARATUS AND METHOD FOR ROUTING ACCESS BASED ON DEVICE LOAD

CROSS-REFERENCE TO RELATED APPLICATION

This application is based upon and claims the benefit of priority of the prior Japanese Patent Application No. 2017-068585, filed on Mar. 30, 2017, the entire contents of which are incorporated herein by reference.

FIELD

The embodiments discussed herein are related to an apparatus and a method for accessing a storage system that includes a plurality of storage devices with different access speeds.

BACKGROUND

A technology is known that performs load balancing between a plurality of storage devices in a storage system (for example, Japanese Laid-open Patent Publication No. 9-44381).

A storage system is known that uses, for example, a high-speed solid state drive (SSD) that uses a semiconductor memory and a low-speed hard disk drive (HDD). Conventionally, in this storage system, a controller included in the storage system performs a hierarchical control to transfer data between an SSD and an HDD according to how frequently data is accessed. In this storage system, data is written to the SSD first, and data that is accessed less frequently is transferred to the HDD. After that, when the data in the HDD is accessed, the data will be used after it is transferred from the HDD to the SSD.

In recent years, an SSD that uses a storage class memory (hereinafter referred to as an "SCM") that is higher speed than a conventional NAND flash memory has been expected to be used in a storage system, where such an SSD is hereinafter referred to as an "SCM SSD".

However, if a controller included in a storage system that uses an SCM SSD performs load balancing within the storage system as in the past, it will be difficult to make good use of a high-speed performance of an SCM because the latency becomes higher.

SUMMARY

According to an aspect of the present invention, an information processing apparatus includes a memory and a processor and accesses a first storage device and a second storage device wherein an access speed of the second storage device is higher than an access speed of the first storage device. The memory stores information relating to a request in a request from the information processing apparatus to the second storage device. The processor, which is connected to the memory, determines a load on the second storage device based on the information relating to the request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a configuration of a storage system;

FIGS. 3A and 3B are diagrams for explaining a configuration and a control method according to a first embodiment;

FIGS. 4A and 4B illustrate a control operation at the time of reading data according to the first embodiment;

FIGS. 5A and 5B illustrate a control operation at the time of writing data according to the first embodiment;

FIG. 10 illustrates an example of a data configuration of information relating to a load state maintained by a load state memory;

FIG. 13 is a flowchart that illustrates an example of a first control process at the time of writing data according to the first embodiment;

FIG. 16 is a flowchart that illustrates an example of a first control process at the time of reading data according to the second embodiment;

FIG. 18 illustrates an example of a system configuration of the third embodiment;

FIG. 21 is a flowchart that illustrates an example of a second control process at the time of writing data according to the third embodiment;

DESCRIPTION OF EMBODIMENTS

Embodiments will be described in detail with reference to the drawings. FIG. 1 illustrates an example of a configuration of a storage system employed in each of the embodiments described later. In this example, a server 103 can access an SSD (hereinafter referred to as "NAND SSD") 101 that uses a NAND flash memory and an SCM SSD 102 through a switch (hereinafter referred to as a "Pcie switch") 104. The NAND SSD 101 operates as a first storage device, and the SCM SSD 102 operates as a second storage device that can be accessed at a higher speed than the NAND SSD 101. There are one or more servers 103 #1-#N (N is an arbitrary natural number). The Pcie switch 104 supports a PCI express serial interface that is a type of an expansion bus. In this example, a controller dedicated to controlling a data distribution to the NAND SSD 101 and the SCM SSD 102 is not provided, but the server 103 directly controls the NAND SSD 101 and the SCM SSD 102.

Figure 2A:
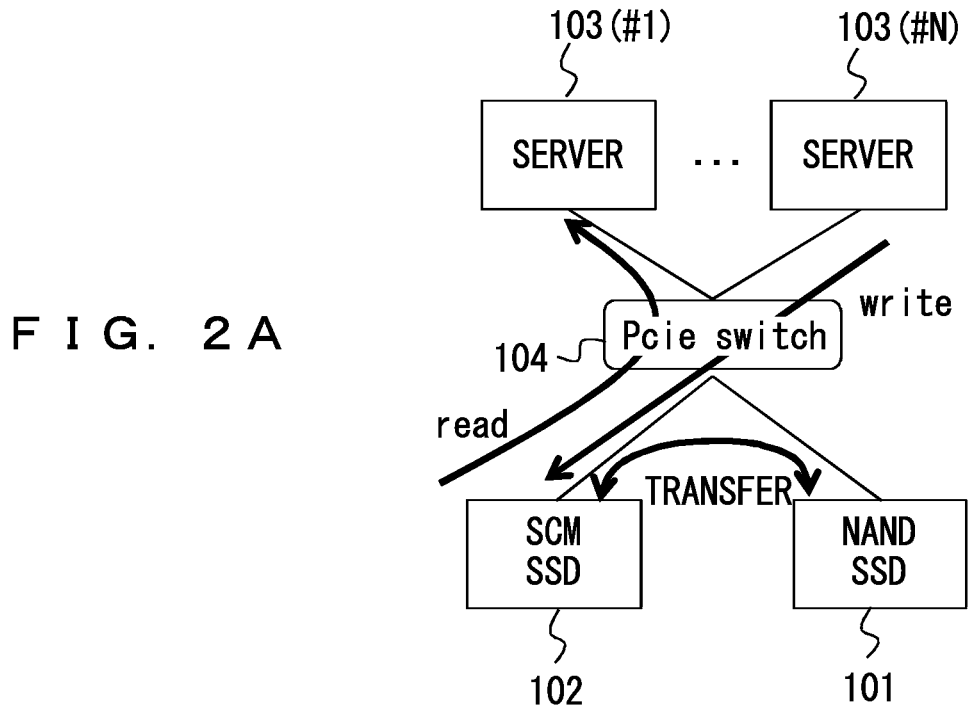
FIGS. 2A-2C are diagrams for explaining a method for controlling the storage system and problems with the control method.
Figure 2B:
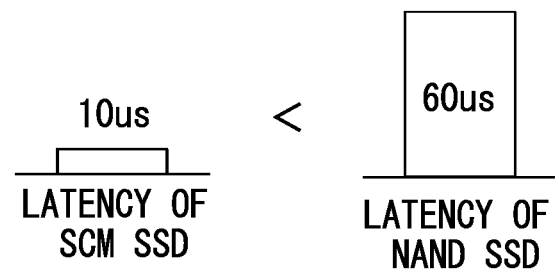
Figure 2C:
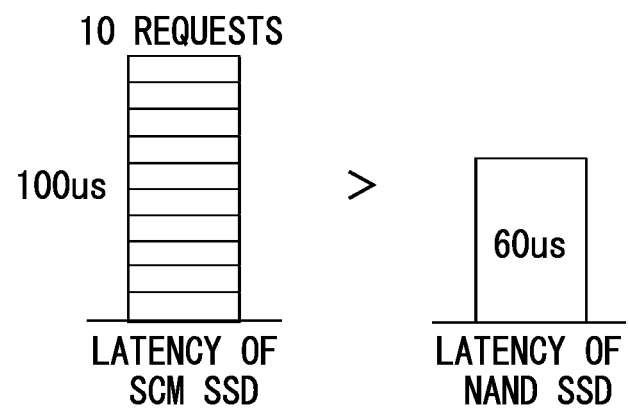

FIGS. 2A-2C are diagrams for explaining a method for controlling the storage system illustrated in FIG. 1 and problems with the control method. As illustrated in FIG. 2A, each server 103 writes data into and reads data from the higher-speed SCM SSD 102. Data that is accessed less frequently is transferred from the SCM SSD 102 to the lower-speed NAND SSD 101.

It is assumed that the control method described above is performed when the load on the SCM SSD 102 is low. For example, it is assumed that the number of requests stacked in a request queue of the SCM SSD 102 is one and the number of requests stacked in a request queue of the NAND SSD 101 is also one. In this case, as illustrated in FIG. 2B, the latency of the SCM SSD 102=10 μs (microsecond) is considerably lower than the latency of the NAND SSD 101=60 μs. This indicates that the SCM SSD 102 has a higher access performance than the NAND SSD 101.

On the other hand, it is assumed that the load on the SCM SSD 102 is high. For example, it is assumed that the number of requests stacked in a request queue of the SCM SSD 102 is ten and the number of requests stacked in a request queue of the NAND SSD 101 is one. In this case, as illustrated in FIG. 2C, the latency of the SCM SSD 102=100 μs is higher than the latency of the NAND SSD 101=60 μs. In the control method described above, an access to the SCM SSD 102 is increased with an increase in an amount of data stored in the SCM SSD 102 due to the SCM SSD 102 having a higher capacity. As a result, there is a possibility that it will take a longer time for the SCM SSD 102 to execute a command and it will take a longer time to access the SCM SSD 102 than to access the NAND SSD 101.

An example of a method for solving the problems described above is described with reference to FIGS. 3A and 3B. FIG. 3A illustrates an example of a configuration according to a first embodiment. In addition to the components included in the configuration illustrated in FIG. 1, the configuration of the first embodiment includes a master server 301 that accesses the NAND SSD 101 and the SCM SSD 102 and that is different from the servers 103 #1-#N. The master server 301 collects load information 302 on the SCM SSD 102 from each of the servers 103 #1-#N, and determines a load state of the SCM SSD 102. Each server 103 refers to the load state of the SCM SSD 102 according to a notification from the master server 301. Then, each server 103 transfers data between the SCM SSD 102 and the NAND SSD 101 according to the load state, which results in reducing a concentration of a load on the SCM SSD 102.

The load information is information relating to a request in a request issued to the SCM SSD 102 in each server 103, and indicates, for example, an estimated time to execute a command that is accumulated by each server 103 in an access queue to the SCM SSD 102. For example, the state in which the estimated time to execute a command is long indicates a state of a high load, and the state in which the estimated time to execute a command is short indicates a state of a low load. This estimated execution time is obtained by calculating Formula 1 below.

$$T_i = \sum_{j=1}^{M} (T_{cj} + T_{dj}) \quad (1)$$

$T_i$ is an estimated time to execute a command accumulated in a SCM I/O queue of the server 103 #i (1≤i≤N). The SCM I/O queue is a buffer memory that is implemented in the server 103 and that maintains a command (such as a read command and a write command) issued to the SCM SSD 102 in the form of a FIFO (first-in first-out) list in order to queue the command executions. M is the number of commands accumulated in the SCM I/O queue. $T_{cj}$ is a command processing time for the j-th command accumulated in the SCM I/O queue. $T_{dj}$ is a data transfer time for the j-th command accumulated in the SCM I/O queue.

FIG. 3B is a diagram for explaining a relationship between a command queued in the SCM I/O queue and an estimated execution time $T_i$ in the server 103. For example, "Read 8 KB", "Read 16 KB", and "Read 64 B" are read commands that respectively read 8 KB (8 kilobytes) of data, 16 KB of data, and 64 B (64 bytes) of data. "Write 16 KB" is a write command that writes 16 KB of data. As illustrated in FIG. 3B, the command processing time $T_{cj}$ and the command transfer time $T_{dj}$ are accumulated for each command queued in the SCM I/O queue so that the estimated execution time $T_i$ in one server 103 is calculated.

The master server 301 determines a load state of the SCM SSD 102 based on a result of adding the estimated execution times $T_i$ in the servers 103 #1-#N, and push-notifies the servers 103 #1-#N of the load state when the load state is changed. Here, the master server 301 determines "load state=low" when the sum of the estimated execution times $T_i$ is less than a specified threshold, and determines "load state=high" when the sum of the estimated execution times $T_i$ is greater than the threshold. This threshold is determined according to the system requirements (according to the maximum permitted latency), and is, for example, 100 µs.

FIGS. 4A and 4B illustrate a control operation at the time of reading data according to the first embodiment.

It is assumed that, as illustrated in FIG. 4A, the server 103(#1) reads data from the SCM SSD 102 (STEP 1). Here, the server 103(#1) refers to a result of a determination of a load state of the SCM SSD 102 when the server 103(#1) is push-notified by the master server 301. When the SCM SSD 102 is under a high load (for example, the sum of the estimated execution times $T_i$ is greater than a specified threshold), the server 103(#1) transfers the data read from the SCM SSD 102 to the NAND SSD 101 and writes the read data to the NAND SSD 101 (STEP 2). Here, the server 103(#1) deletes (invalidates) the read data in the SCM SSD 102.

On the other hand, it is assumed that, as illustrated in FIG. 4B, the server 103(#1) reads data from the NAND SSD 101 (STEP 1). Here, the server 103(#1) also refers to a result of the determination of the load state of the SCM SSD 102 when the server 103(#1) is push-notified by the master server 301. When the SCM SSD 102 is under a low load (for example, the sum of the estimated execution times $T_i$ is less than the specified threshold), the server 103(#1) transfers the data read from the NAND SSD 101 to the SCM SSD 102 and writes the read data to the SCM SSD 102 (STEP 2). Here, the server 103(#1) deletes (invalidates) the read data in the NAND SSD 101.

FIG. 5A illustrates a first control operation at the time of writing data according to the first embodiment. For example, the server 103(#1) refers to a result of a determination of a load state of the SCM SSD 102 when the server 103(#1) is push-notified by the master server 301. When the SCM SSD 102 is under a low load (for example, the sum of the estimated execution times $T_i$ is less than a specified threshold), the server 103(#1) writes data to the SCM SSD 102 (STEP 1). On the other hand, when the SCM SSD 102 is under a high load (for example, the sum of the estimated execution times $T_i$ is greater than the specified threshold), the server 103(#1) writes data to the NAND SSD 101 (STEP 2).

FIG. 5B illustrates a second control operation at the time of writing data according to the first embodiment. For example, when the size of data to be written is greater than a specified threshold for a data size, the server 103(#1) writes the data to the NAND SSD 101 (STEP 1). On the other hand, when the size of the data to be written is less than the threshold for a data size, the server 103(#1) refers to a result of a determination of a load state of the SCM SSD 102 when the server 103(#1) is push-notified by the master server 301. When the size of the data to be written is less than the threshold for a data size and when the SCM SSD 102 is under a low load (for example, the sum of the estimated execution times $T_i$ is less than a specified threshold), the server 103(#1) writes the data to the SCM SSD 102 (STEP 2). When the size of the data to be written is less than the threshold for a data size and when the SCM SSD 102 is under a high load (for example, the sum of the estimated execution times $T_i$ is greater than the specified threshold), the server 103(#1) writes the data to the NAND SSD 101 (STEP 3).

As described with reference to FIGS. 2A-2C, in the control method in which less-frequently accessed data is transferred from the SCM SSD 102 to the NAND SSD 101, it is difficult to prevent a decrease in the performance of the SCM SSD 102 when the SCM SSD 102 is accessed intensively.

On the other hand, in the first embodiment, described with reference to FIGS. 3A-5B, the load state of the SCM SSD 102 is determined. Then, a portion of data overly concentrated in the SCM SSD 102 is transferred to the NAND SSD 101. As described, a portion of a load is distributed to the NAND SSD 101 that can only be accessed slowly, which results in increasing the average of a speed at which the NAND SSD 101 is accessed and a speed at which the SCM SSD 102 is accessed. This makes it possible to avoid a state in which a high-speed access to the SCM SSD 102 is not provided due to an overly intensive load on the SCM SSD 102.

For example, in the example of FIG. 2C, ten requests are concentrated in the SCM SSD 102 and its latency is 100 µs. However, the average of the latencies of the SCM SSD 102 and the NAND SSD 101 will be 60 µs if a portion of accesses are distributed to the NAND SSD 101.

As described above, in the first embodiment, it is possible to make good use of a high-speed access to the SCM SSD 102 included in a storage system by detecting a load state of the SCM SSD 102 based on information relating to a request in a request to the SCM SSD 102.

Further, in the first embodiment, the master server 301 receives load information on the SCM SSD 102 in each of the servers 103 #1-#N. Then, the master server 301 determines an overall load state of the SCM SSD 102 and push-notifies each server 103 of a result of the determination. This permits an efficient access control to a storage system that includes the NAND SSD 101 and the SCM SSD 102.

Figure 6:
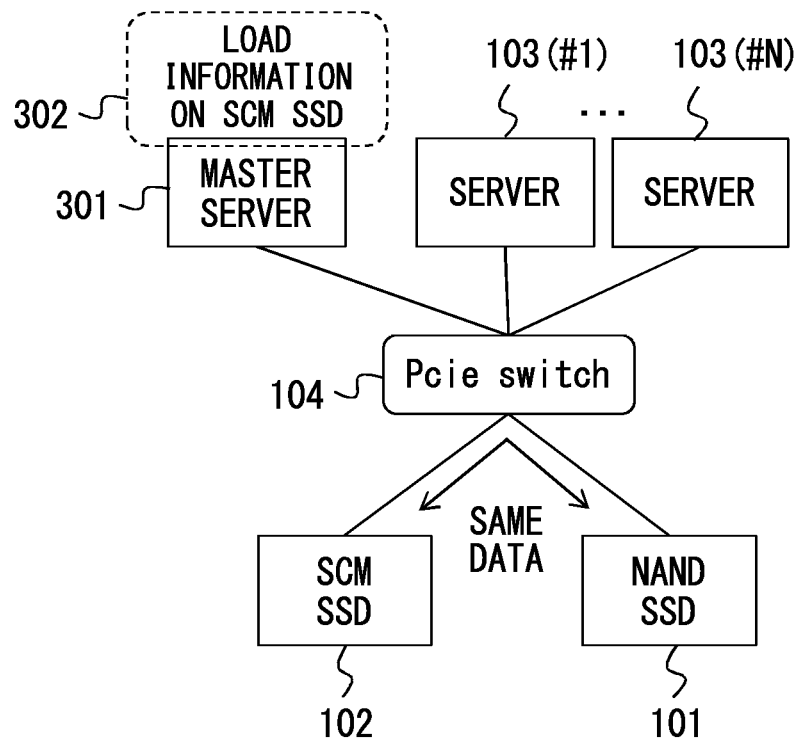
FIG. 6 illustrates a control operation according to a second embodiment.

FIG. 6 illustrates a control operation according to a second embodiment. As in the first embodiment, the configuration of the second embodiment includes the master server 301. As in the first embodiment, the master server 301 determines a load state of the SCM SSD 102 based on a result of adding the estimated execution times $T_i$ in the servers 103 #1-#N. Then, the master server 301 push-notifies the servers 103 #1-#N of the load state when the load state has been changed. Each server 103 writes data to the NAND SSD 101 at the time of writing data, and also copies the data to the SCM SSD 102 according to the load state of the SCM SSD 102. Each server 103 reads data from the SCM SSD 102 and the NAND SSD 101 at the same time when reading data. Alternatively, each server 103 selects the data in the SCM SSD 102 or in the NAND SSD 101 according to the load state of the SCM SSD 102.

A specific control operation at the time of writing data according to the second embodiment is described below. The server 103 refers to a result of a determination of the load state of the SCM SSD 102 when the server 103 is push-notified by the master server 301. The server 103 writes the same data to both the NAND SSD 101 and the SCM SSD 102 when the SCM SSD 102 is under a low load (for example, the sum of the estimated execution times $T_i$ is less than a specified threshold). The data may be written to the SCM SSD 102 and then transferred to the NAND SSD 101. On the other hand, the server 103 writes the data only to the NAND SSD 101 when the SCM SSD 102 is under a high load (for example, the sum of the estimated execution times $T_i$ is greater than the specified threshold).

When data to be read is stored in both the NAND SSD 101 and the SCM SSD 102, a first control operation described is performed. The server 103 refers to a result of a determination of the load state of the SCM SSD 102 when the server 103 is push-notified by the master server 301. The server 103 reads data from the SCM SSD 102 when the SCM SSD 102 is under a low load (for example, the sum of the estimated execution times $T_i$ is less than a specified threshold). On the other hand, the server 103 reads the data from the NAND SSD 101 when the SCM SSD 102 is under a high load (for example, the sum of the estimated execution times $T_i$ is greater than the specified threshold).

Alternatively, when data to be read is stored in both the NAND SSD 101 and the SCM SSD 102, a second control operation described below is performed. The server 103 reads the same data from both the NAND SSD 101 and the SCM SSD 102, and selects data that has been read faster. When the data reading from the NAND SSD 101 is faster, the server 103 deletes the data stored in the SCM SSD 102.

When data to be read is stored only in the NAND SSD 101, the server 103 refers to a result of a determination of the load state of the SCM SSD 102 when the server 103 is push-notified by the master server 301. When the SCM SSD 102 is under a low load (for example, the sum of the estimated execution times $T_i$ is less than a specified threshold), the server 103 reads the data from the NAND SSD 101 and then copies the read data to the SCM SSD 102.

As described above, in the second embodiment, data is written to both the NAND SSD 101 and the SCM SSD 102 or only to the NAND SSD 101 according to the load state of the SCM SSD 102. Further, data that has been read faster is selected at the time of reading data. When the load on the SCM SSD 102 becomes lower, data is copied to the SCM SSD 102. As in the first embodiment, this control operation makes it possible to avoid a state in which a high-speed access to the SCM SSD 102 is not provided due to an overly intensive load on the SCM SSD 102.

Figure 7:
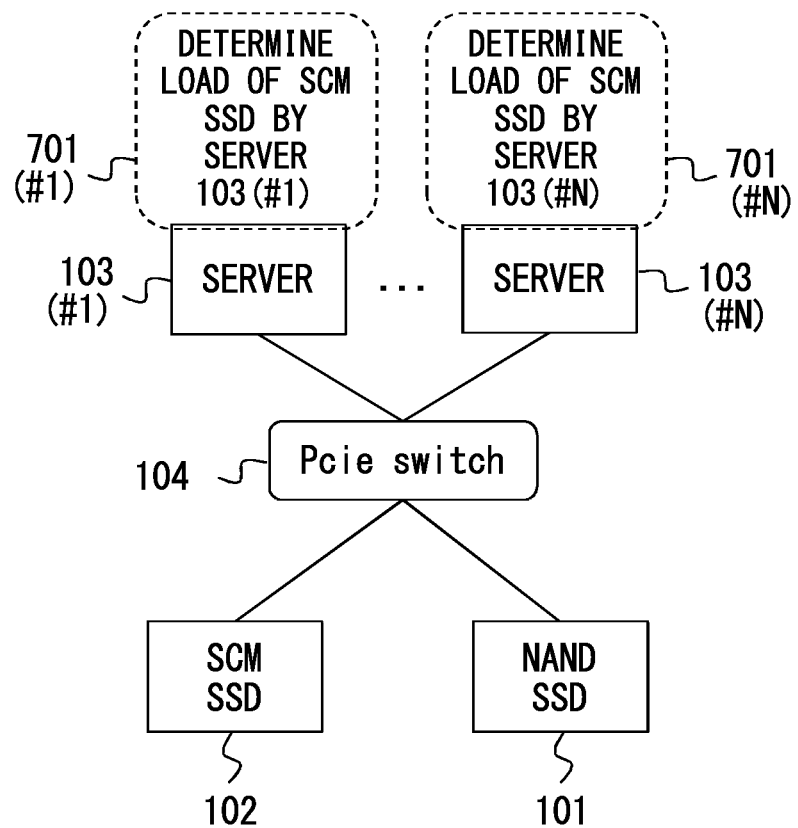
FIG. 7 illustrates a control operation according to a third embodiment.

FIG. 7 illustrates a control operation according to a third embodiment. The configuration of the third embodiment is different from those of the first and second embodiments in that it is not provided with the master server 301. The servers 103 #1-#N respectively collect load information 701 #1-#N on the SCM SSD 102 and determine a load state of the SCM SSD 102. The control operation based on a result of the determination of the load state of the SCM SSD 102 may be the same as that of the first embodiment or the second embodiment.

Figure 8:
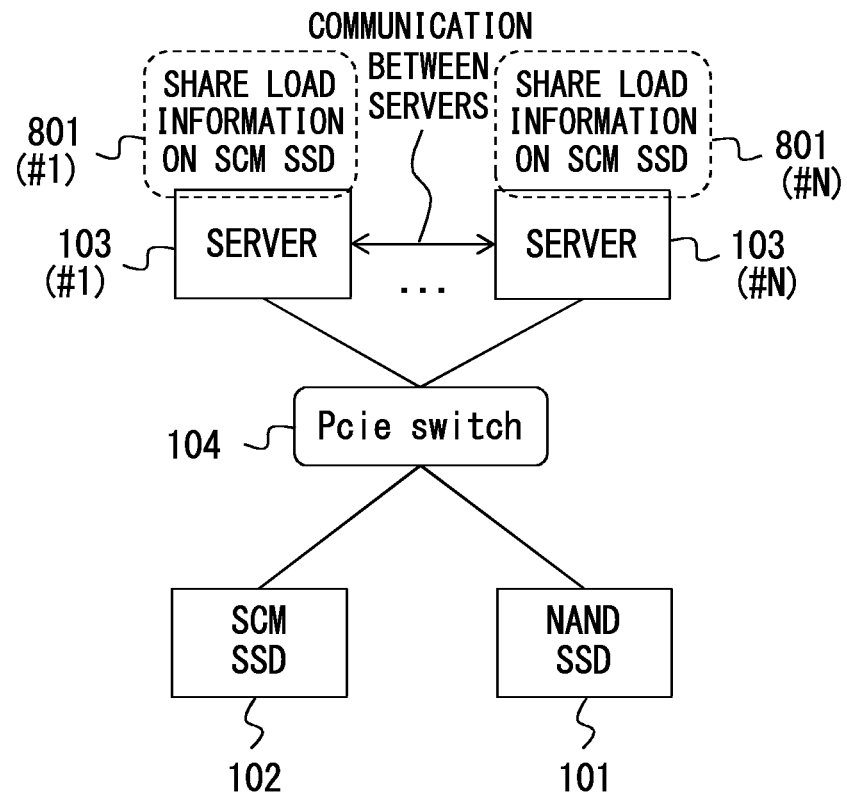
FIG. 8 illustrates a control operation according to a fourth embodiment.

FIG. 8 illustrates a control operation according to a fourth embodiment. As in the third embodiment, the configuration of the fourth embodiment is not provided with the master server 301. The servers 103#1-#N share load information 801 #1-#N by communicating with one another. Then, the servers 103 #1-#N respectively determine a load state of the SCM SSD 102 according to the shared load information 801. The control operation based on a result of the determination of the load state of the SCM SSD 102 may be the same as that of the first embodiment or the second embodiment.

Figure 9:
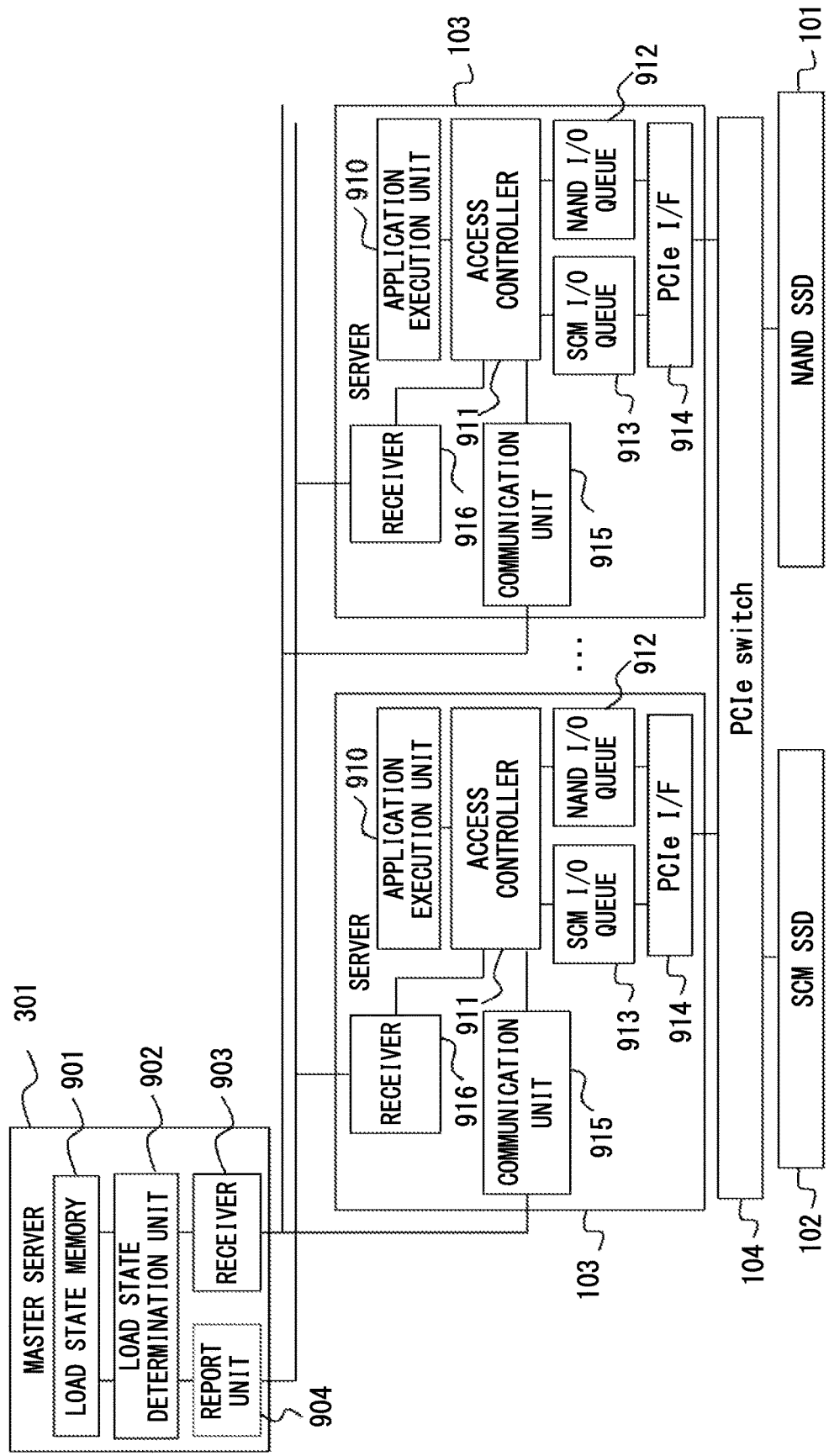
FIG. 9 illustrates an example of a system configuration of the first and the second embodiments.

FIG. 9 illustrates an example of a system configuration of the first and second embodiments (FIG. 3A). The NAND SSD 101, the SCM SSD 102, the servers 103 #1-#N, the Pcie switch 104, and the master server 301 in FIG. 9 correspond to the NAND SSD 101, the SCM SSD 102, the servers 103 #1-#N, Pcie switch 104, and the master server 301 in FIG. 3A, respectively.

The master server 301 includes a load state memory 901, a load state determination unit 902, a load information receiver 903, and a load state report unit 904.

The load state memory 901 maintains information relating to a load state of the SCM SSD 102. The load state determination unit 902 receives load information on the SCM SSD 102 from each of the servers 103 #1-#N through the load information receiver 903 so as to determine a load on the SCM SSD 102, and when a result of the determination has been changed, the load state determination unit 902 notifies each of the servers 103 #1-#N of the load state through the load state report unit 904.

The load information receiver 903 receives the load information on the SCM SSD 102 from each of the servers 103 #1-#N and provides it to the load state determination unit 902. The load state report unit 904 push-notifies each of the servers 103 #1-#N of the load state according to an instruction given by the load state determination unit 902.

Each of the servers 103 #1-#N includes an application execution unit 910, an access controller 911, a NAND I/O queue 912, an SCM I/O queue 913, a Pcie I/F 914, a load information report unit 915, and a load state receiver 916.

The application execution unit 910 performs a process involving accesses to the NAND SSD 101 and the SCM SSD 102. In the first embodiment, the access controller 911 determines a data-writing destination and transfers the data according to a load state of the SCM SSD 102 that is received from the master server 301 through the load state receiver 916. Further, when the state of the SCM I/O queue 913 has been changed, the access controller 911 calculates an estimated execution time using Formula 1 described above, and reports the estimated execution time to the master server 301 as load information through the load information report unit 915. The operation of the access controller 911 according to the second embodiment will be described later.

The NAND I/O queue 912 is a buffer that maintains a command (such as a read command and a write command) issued to the NAND SSD 101 in the form of a FIFO list in order to queue the command executions. Likewise, the SCM I/O queue 913 is a buffer that maintains a command (such as a read command and a write command) issued to the SCM SSD 102 in the form of a FIFO list in order to queue the command executions.

The load state receiver 916 receives a load state of the SCM SSD 102 from the load state report unit 904 included in the master server 301 and maintains the load state. The load information report unit 915 reports, to the load information receiver 903 included in the master server 301, the load information of the SCM SSD 102 that is obtained from the access controller 911. The Pcie I/F 914 is a PCI express serial interface circuit that transfers command data issued by the NAND I/O queue 912 to the NAND SSD 101 through the Pcie switch 104.

FIG. 10 illustrates an example of a data configuration of information relating to a load state maintained by the load state memory 901. The load state memory 901 maintains an estimated execution time $T_i$ ($1 \leq i \leq N$) that is load information calculated by each of the servers 103 #1-#N using Formula 1 and reported by each of the servers 103 #1-#N, and the sum of the respective estimated execution times (total load). Then, the load state memory 901 maintains a load state ("high", "equal", or "less") determined by the load state determination unit 902 comparing the total load with a threshold (for example, 100 μs) that is determined according to the system requirements (maximum permitted latency). The load state determination unit 902 monitors, every time determination is performed, whether a value for this load state has been changed and push-notifies the load state receiver 916 included in each of the servers 103 #1-#N of a new load state through the load state report unit 904 when a change has occurred.

Figure 11:
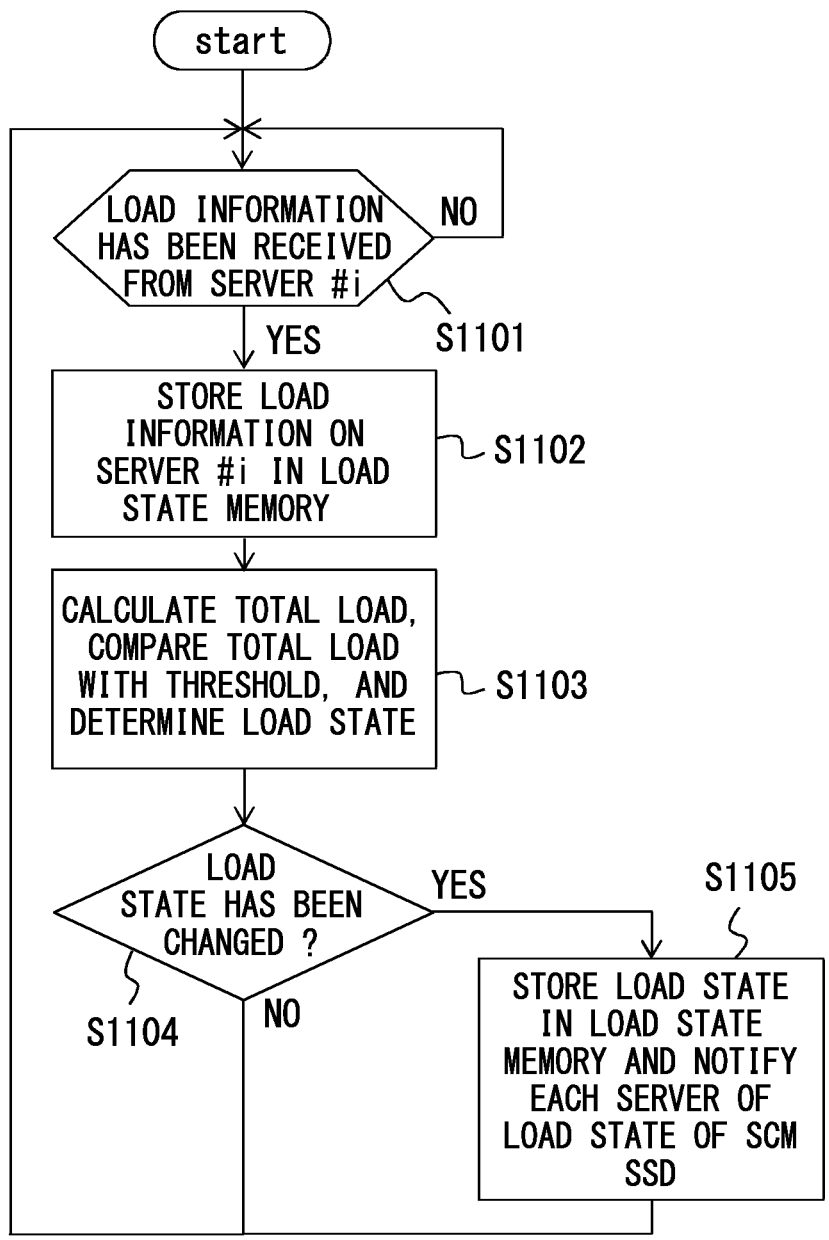
FIG. 11 is a flowchart that illustrates an example of a control process performed in a master server according to the first embodiment.

FIG. 11 is a flowchart that illustrates an example of a control process performed in the master server 301 according to the first embodiment.

The load information receiver 903 included in the master server 301 waits until the load information receiver 903 receives an estimated execution time $T_i$, load information, from an arbitrary server 103 #i (a determination of "NO" is repeated in Step S1101).

When the load information receiver 903 has received the load information (YES in Step S1101), the load information receiver 903 stores the received estimated execution time $T_i$ in the load state memory 901 in the data format illustrated in FIG. 10. The received estimated execution time $T_i$ is load information on the server 103 #i (Step S1102).

Next, the load state determination unit 902 included in the master server 301 recalculates the total load in the load state memory 901 (see FIG. 10), compares the total load with a threshold, and determines a new load state corresponding to a result of the comparison (Step S1103).

The load state determination unit 902 determines whether there is a change in load state between the load state before the recalculation and the new load state obtained by the recalculation in Step S1103 (Step S1104).

When the determination in Step S1104 is YES, the load state determination unit 902 stores, in the load state memory 901, the load state newly obtained in Step S1103 in the data format illustrated in FIG. 10. Then, the load state determination unit 902 notifies the load state receiver 916 included in each of the servers 103 #1-#N of the above load state of the SCM SSD 102 through the load state report unit 904 illustrated in FIG. 9 (Step S1105).

When the determination in Step S1104 is NO, the load state determination unit 902 skips the process of Step S1105.

After that, the control process performed in the master server 301 returns to the process of Step S1101 in which the load information receiver 903 is in a standby state.

Figure 12:
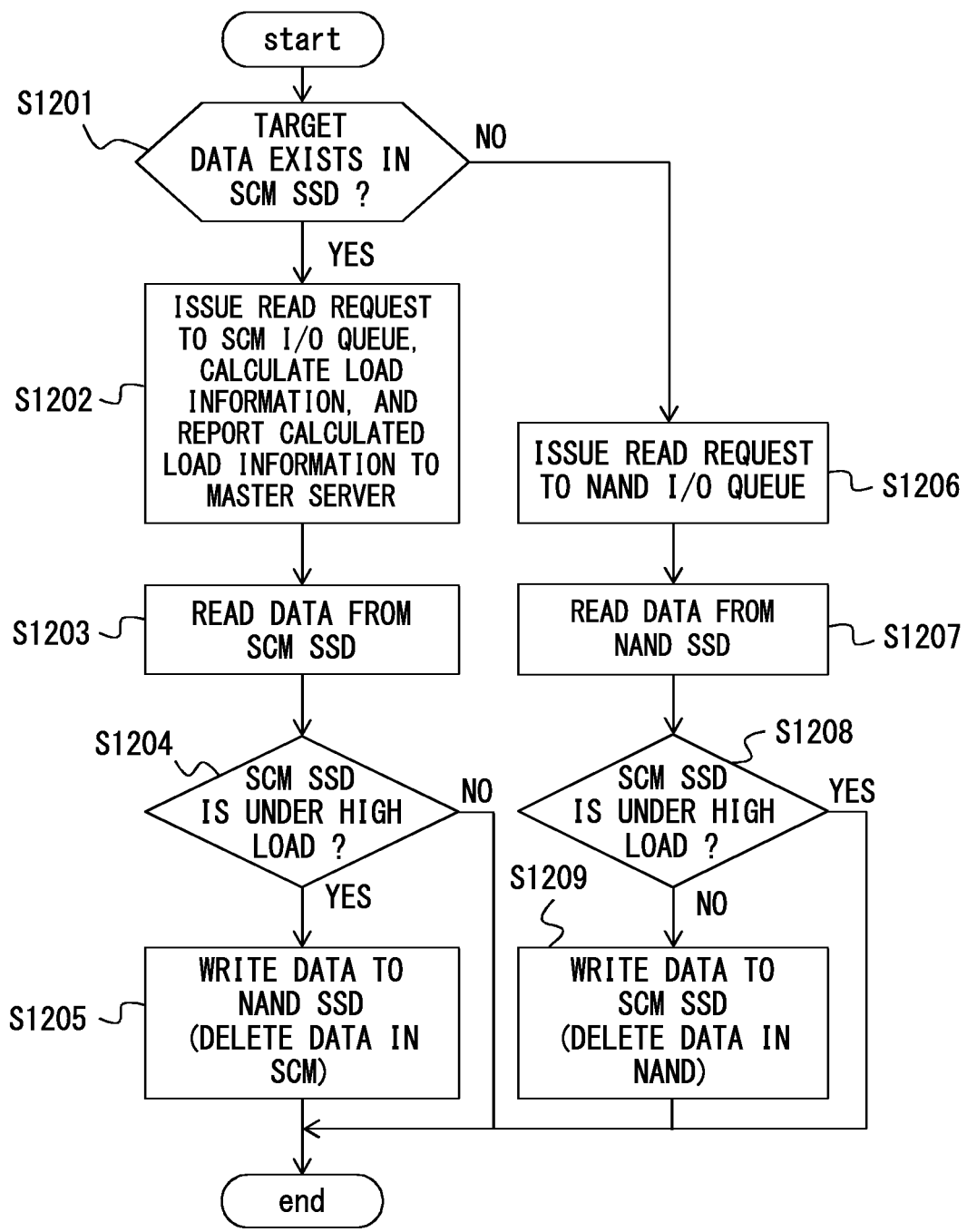
FIG. 12 is a flowchart that illustrates an example of a control process at the time of reading data according to the first embodiment.

FIG. 12 is a flowchart that illustrates an example of a control process performed by the access controller 911 at the time of reading data according to the first embodiment. This control process corresponds to the control operation at the time of reading data according to the first embodiment that has been described with reference to FIG. 4A or 4B.

First, the access controller 911 determines whether reading target data (data to be read) requested by the application execution unit 910 illustrated in FIG. 9 exists in the SCM SSD 102 (Step S1201). Here, it is assumed that the access controller 911 has control over whether each piece of data to be read is stored in the NAND SSD 101 or the SCM SSD 102.

When the access controller 911 has determined that the reading target data exists in the SCM SSD 102 (YES in Step S1201), the access controller 911 issues a read request to the SCM I/O queue 913. Next, the access controller 911 calculates, according to the state of the SCM I/O queue 913, an estimated execution time $T_i$ that is load information ("i" identifies one of the servers 103) using Formula 1 above. Then, the access controller 911 reports the calculated load information to the load information receiver 903 included in the master server 301 through the load information report unit 915 (Step S1202).

Next, the access controller 911 reads the reading target data from the SCM SSD 102 (Step S1203).

Then, according to the load state received (push-notified) from the master server 301 through the load state receiver 916, the access controller 911 determines whether the SCM SSD 102 is under a high load (Step S1204).

When the access controller 911 has determined that the SCM SSD 102 is under a high load (YES in Step S1204), the access controller 911 performs the following operation. The access controller 911 issues a write request to the NAND I/O queue 912 so as to write, to the NAND SSD 101, the data read from the SCM SSD 102 in Step S1203. The access controller 911 deletes (invalidates) the read data stored in the SCM SSD 102 (Step S1205).

When the access controller 911 has determined that the SCM SSD 102 is under a low load (NO in Step S1204), the access controller 911 skips the process of Step S1205.

The processes of Steps S1202-S1205 correspond to the operation described with reference to FIG. 4A.

On the other hand, when the access controller 911 has determined that the reading target data exists in the NAND SSD 101 (NO in Step S1201), the access controller 911 issues a read request to the NAND I/O queue 912 (Step S1206).

Next, the access controller 911 reads reading target data from the NAND SSD 101 (Step S1207).

Then, according to the load state received from the master server 301 through the load state receiver 916, the access controller 911 determines whether the SCM SSD 102 is under a high load (Step S1208).

When the access controller 911 has determined that the SCM SSD 102 is under a low load (NO in Step S1208), the access controller 911 issues a write request to the SCM I/O queue 913 so as to write, to the SCM SSD 102, the data read from the NAND SSD 101 in Step 1207. The access controller 911 deletes (invalidates) the read data stored in the NAND SSD 101 (Step S1209).

When the access controller 911 has determined that the SCM SSD 102 is under a high load (YES in Step 1208), the access controller 911 skips the process of Step S1209.

The processes of Steps S1206-S1209 correspond to the operation described with reference to FIG. 4B.

FIG. 13 is a flowchart that illustrates an example of a first control process performed by the access controller 911 at the time of writing data according to the first embodiment. This control process corresponds to the first control operation at the time of writing data according to the first embodiment that has been described with reference to FIG. 5A.

First, according to the load state received from the master server 301 through the load state receiver 916, the access controller 911 determines whether the SCM SSD 102 is under a high load (Step S1301).

When the access controller 911 has determined that the SCM SSD 102 is under a low load (NO in Step S1301), the access controller 911 issues a write request to the SCM I/O queue 913. Next, the access controller 911 calculates, according to the state of the SCM I/O queue 913, an estimated execution time $T_i$ that is load information using Formula 1 above. Then, the access controller 911 reports the calculated load information to the load information receiver 903 included in the master server 301 through the load information report unit 915 (Step S1302).

The access controller 911 writes, to the SCM SSD 102, the data provided by the application execution unit 910 illustrated in FIG. 9 (Step S1303).

When the access controller 911 has determined that the SCM SSD 102 is under a high load (YES in Step S1301), the access controller 911 issues a write request to the NAND I/O queue 912 (Step S1304).

Then, the access controller 911 writes the data to the NAND SSD 101 (Step S1305).

Figure 14:
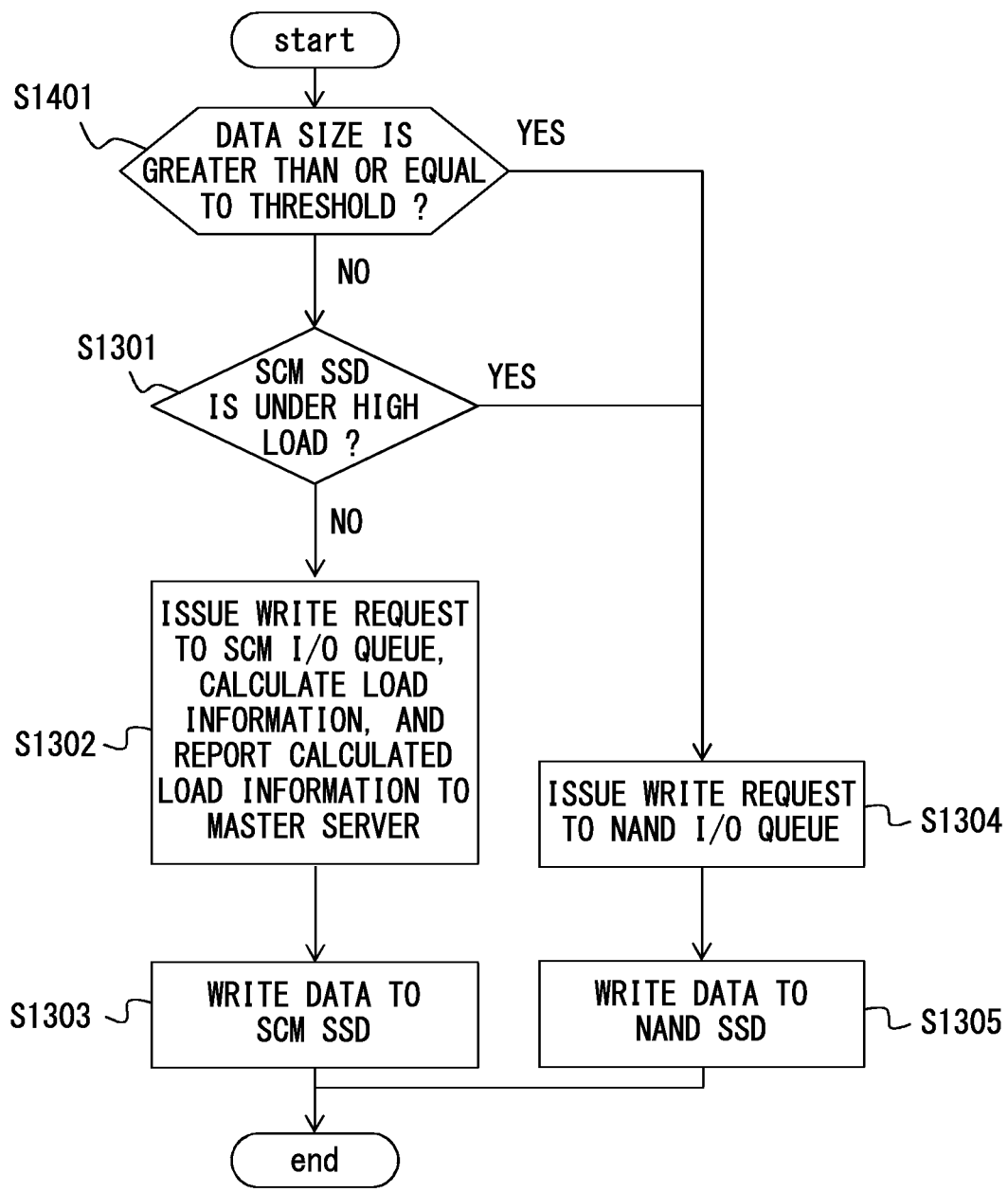
FIG. 14 is a flowchart that illustrates an example of a second control process at the time of writing data according to the first embodiment.

FIG. 14 is a flowchart that illustrates an example of a second control process performed by the access controller 911 at the time of writing data according to the first embodiment. This control process corresponds to the second control operation at the time of writing data according to the first embodiment that has been described with reference to FIG. 5B. FIG. 14 has the same step numbers for the same steps as FIG. 13. FIG. 14 is different from FIG. 13 in that FIG. 14 includes Step S1401.

The access controller 911 determines whether the size of writing target data (data to be written) provided by the application execution unit 910 illustrated in FIG. 9 is greater than or equal to a specified threshold (Step S1401).

When the access controller 911 has determined that the size of the writing target data is greater than or equal to the specified threshold (YES in Step S1401), the access controller 911 performs the processes of Steps S1304 and S1305 described with reference to FIG. 13, so as to write the data to the NAND SSD 101.

On the other hand, when the access controller 911 has determined that the size of the writing target data is less than the specified threshold (NO in Step S1401), the access controller 911 performs the processes of and after Step S1301 that have been described with reference to FIG. 13. In other words, when the size of the writing target data is less than the specified threshold and the SCM SSD 102 is under a low load, the access controller 911 writes the data to the SCM SSD 102 (the process moves on to Steps S1302 and S1303 from Step S1301). On the other hand, when the size of the writing target data is less than the specified threshold and the SCM SSD 102 is under a high load, the access controller 911 writes the data to the NAND SSD 101 (the process moves on to Steps S1304 and S1305 from Step S1301).

Next, the second embodiment is described in detail. The system configuration of the second embodiment is similar to the system configuration of the first embodiment that is illustrated in FIG. 9.

In the second embodiment, at the time of writing data, the access controller 911 writes data to the NAND SSD 101, and further writes the same data to the SCM SSD 102 when the SCM SSD 102 is under a low load, as described with reference to FIG. 6. At the time of reading data, the access controller 911 determines a data reading source SSD according to the load state of the SCM SSD 102, so as to read the data from the source SSD.

Figure 15:
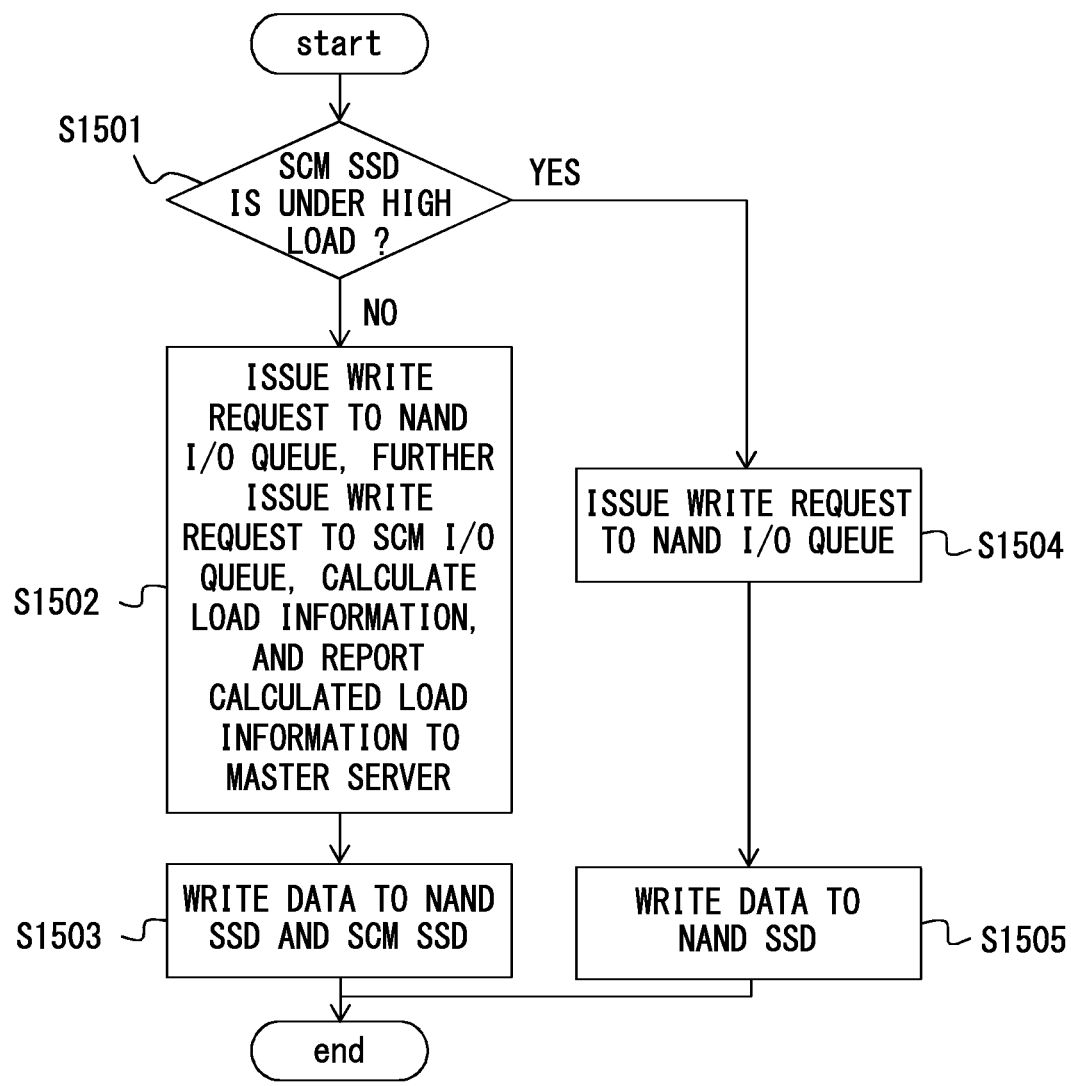
FIG. 15 is a flowchart that illustrates an example of a control process at the time of writing data according to the second embodiment.

FIG. 15 is a flowchart that illustrates an example of a control process at the time of writing data according to the second embodiment. This control process corresponds to the control operation at the time of writing data according to the second embodiment that has been described with reference to FIG. 6.

First, according to the load state received from the master server 301 through the load state receiver 916, the access controller 911 determines whether the SCM SSD 102 is under a high load (Step S1501).

When the access controller 911 has determined that the SCM SSD 102 is under a low load (NO in Step S1501), the access controller 911 issues a write request to the NAND I/O queue 912 and further issues a write request to the SCM I/O queue 913. Next, the access controller 911 calculates, according to the state of the SCM I/O queue 913, an estimated execution time $T_i$ that is load information using Formula 1 above. Then, the access controller 911 reports the calculated load information to the load information receiver 903 included in the master server 301 through the load information report unit 915 (Step S1502).

The access controller 911 writes, to both the NAND SSD 101 and the SCM SSD 102, the data provided by the application execution unit 910 illustrated in FIG. 9 (Step S1503).

When the access controller 911 has determined that the SCM SSD 102 is under a high load (YES in Step S1501), the access controller 911 issues a write request to the NAND I/O queue 912 (Step S1504). Then, the access controller 911 writes the data only to the NAND SSD 101 (Step S1505).

FIG. 16 is a flowchart that illustrates an example of a first control process at the time of reading data according to the second embodiment. This control process corresponds to the first control operation at the time of reading data according to the second embodiment that has been described with reference to FIG. 6.

First, the access controller 911 determines whether reading target data requested by the application execution unit 910 also exists in the SCM SSD 102 in addition to the NAND SSD 101 (Step S1601). This determination process is performed when the data has been written in both the NAND SSD 101 and the SCM SSD 102 by the control process at the time of writing data in the flowchart of FIG. 15.

When the reading target data also exists in the SCM SSD 102 (YES in Step S1601), the access controller 911 determines whether the SCM SSD 102 is under a high load, according to the load state received from the master server 301 through the load state receiver 916 (Step S1602).

When the access controller 911 has determined that the SCM SSD 102 is under a low load (NO in Step S1602), the access controller 911 issues a read request to the SCM I/O queue 913 because the data can be read faster from the SCM SSD 102 than the NAND SSD 101. Next, the access controller 911 calculates, according to the state of the SCM I/O queue 913, an estimated execution time $T_i$ that is load information using Formula 1 above. Then, the access controller 911 reports the calculated load information to the load information receiver 903 included in the master server 301 through the load information report unit 915 (Step S1603).

The access controller 911 reads the reading target data from the SCM SSD 102 (Step S1604).

Next, according to the load state received from the master server 301 through the load state receiver 916, that is, the estimated time to execute a command, the access controller 911 determines whether the SCM SSD 102 has entered into a high-load state (Step S1605).

When the access controller 911 has determined that the SCM SSD 102 is under a high load (YES in Step S1605), the access controller 911 deletes (invalidates) the data read from the SCM SSD 102 (Step S1606).

When the reading target data does not exist in the SCM SSD 102 (NO in Step S1601), the access controller 911 performs the following operation. Further, when the reading target data exists in the SCM SSD 102 and it has been determined that the SCM SSD 102 is under a high load (YES in Step S1602), the access controller 911 also performs the following operation for load balancing. In these cases, the access controller 911 issues a read request to the NAND I/O queue 912 (Step S1607).

Next, the access controller 911 reads the reading target data from the NAND SSD 101 (Step S1608).

After that, according to the load state received from the master server 301 through the load state receiver 916, the access controller 911 determines whether the SCM SSD 102 is under a low load and whether the writing target data exists in the SCM SSD 102 (Step S1609). This process is performed when the determination in Step S1601 is NO.

When the determination in Step S1609 is YES, the access controller 911 issues a write request to the SCM I/O queue 913 so as to copy the reading target data to the SCM SSD 102 (Step S1610). When the reading target data only exists in the NAND SSD 101 and the SCM SSD 102 is under a low load, this process is performed so that, in subsequent data readings, data can be read from the higher-speed SCM SSD 102.

Figure 17:
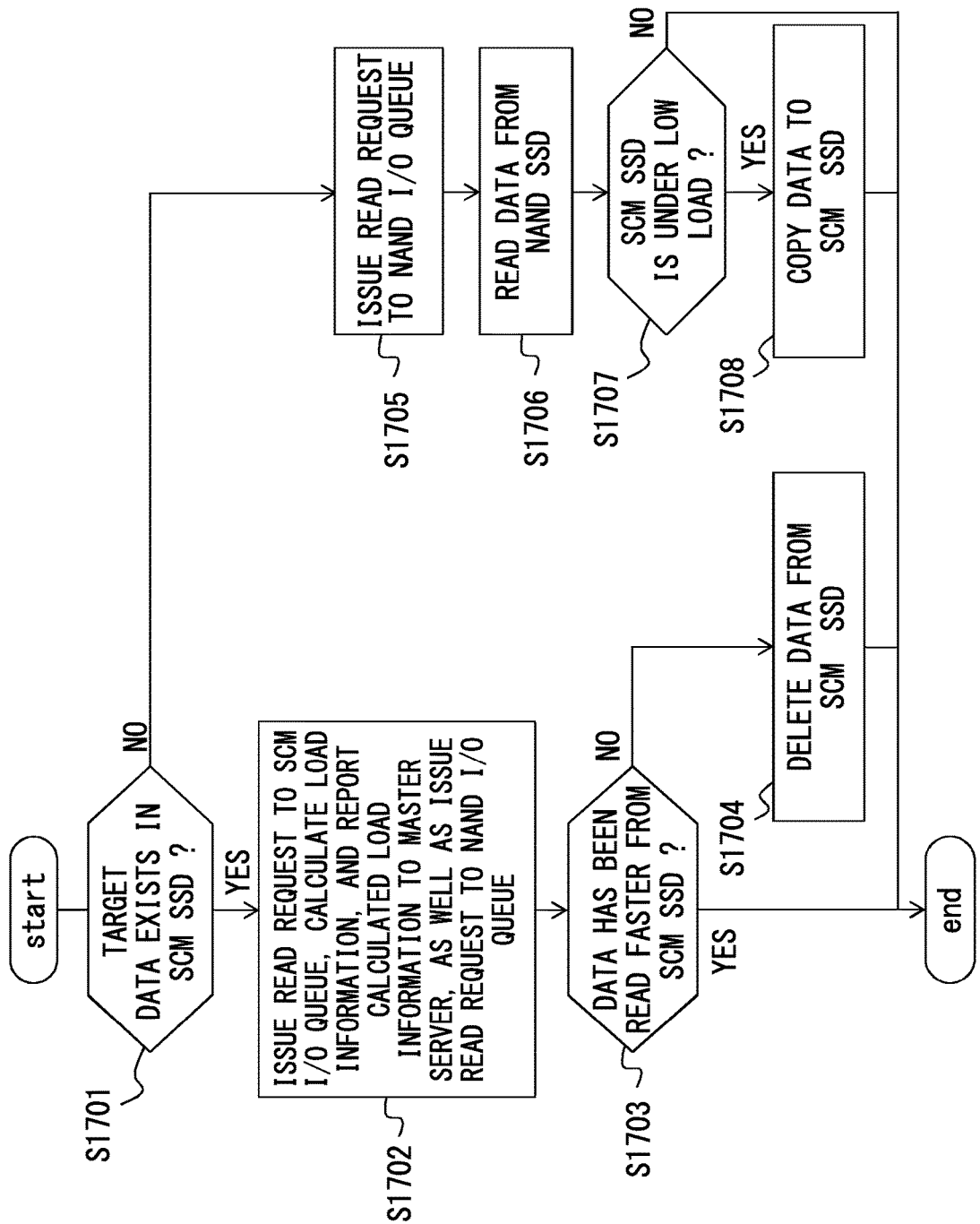
FIG. 17 is a flowchart that illustrates an example of a second control process at the time of reading data according to the second embodiment.

FIG. 17 is a flowchart that illustrates an example of a second control process at the time of reading data according to the second embodiment. This control process corresponds to the second control operation at the time of reading data according to the second embodiment that has been described with reference to FIG. 6.

First, the access controller 911 determines whether reading target data requested by the application execution unit 910 also exists in the SCM SSD 102 in addition to the NAND SSD 101 (Step S1701). This determination process is performed when the data has been written in both the NAND SSD 101 and the SCM SSD 102 by the control process at the time of writing data in the flowchart of FIG. 15.

When the reading target data also exists in the SCM SSD 102 (YES in Step S1701), the access controller 911 issues a read request to the SCM I/O queue 913. Next, the access controller 911 calculates, according to the state of the SCM I/O queue 913, an estimated execution time $T_i$ that is load information using Formula 1 above. Then, the access controller 911 reports the calculated load information to the load information receiver 903 included in the master server 301 through the load information report unit 915. The access controller 911 further issues the same read request to the NAND I/O queue 912 (Step S1702). In other words, the access controller 911 reads the same data from both the NAND SSD 101 and the SCM SSD 102.

The access controller 911 determines, from a result of the request process performed in Step S1702, whether the data has been read faster from the SCM SSD 102 (Step S1703).

When the access controller 911 has determined that the data has been read faster from the NAND SSD 101 than the SCM SSD 102 (NO in Step S1703), the access controller 911 deletes the data read from the SCM SSD 102 (Step S1704). When the access controller 911 has determined that the data has been read faster from the SCM SSD 102 (YES in Step S1703), the access controller 911 skips the process of Step S1704.

When the reading target data does not exist in the SCM SSD 102 (NO in Step S1701), the access controller 911 issues a read request to the NAND I/O queue 912 (Step S1705). Then the access controller 911 reads the reading target data from the NAND SSD 101 (Step S1706).

After that, according to the load state received from the master server 301 through the load state receiver 916, the access controller 911 determines whether the SCM SSD 102 is under a low load (Step S1707).

When the determination in Step S1707 is YES, the access controller 911 issues a write request to the SCM I/O queue 913 so as to copy the reading target data to the SCM SSD 102 (Step S1708). When the reading target data only exists in the NAND SSD 101 and the SCM SSD 102 is under a low load, this process is performed so that, in subsequent data readings, data can be read from the higher-speed SCM SSD 102.

FIG. 18 illustrates an example of a system configuration of the third embodiment. As described with reference to FIG. 7, the configuration of the third embodiment is not provided with the master server 301. Thus, the configuration illustrated in FIG. 18 is obtained by removing the master server 301, the load information report unit 915, and the load state receiver 916 from the configuration of the first or second embodiment illustrated in FIG. 9. Numerical references in FIG. 18 identical to those in FIG. 9 denote the same components.

Figure 19:
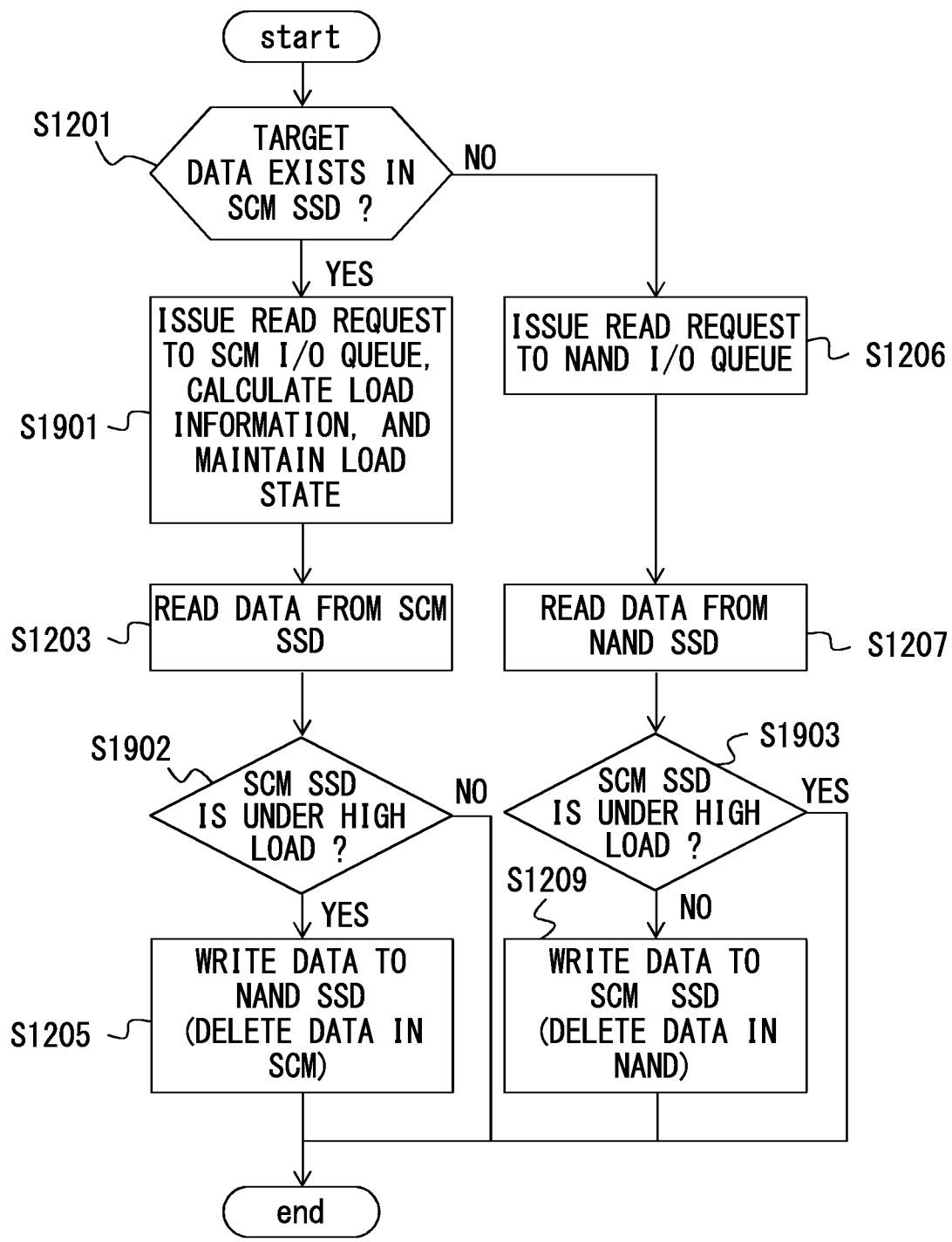
FIG. 19 is a flowchart that illustrates an example of a first control process at the time of reading data according to the third embodiment.

FIG. 19 is a flowchart that illustrates an example of a first control process performed by the access controller 911 at the time of reading data according to the third embodiment. The process of this flowchart corresponds to the above-described control process of FIG. 12 according to the first embodiment, and FIG. 19 has the same step numbers for the same steps as FIG. 12. In other words, in this control process, all of the servers 103 separately perform, without the master server 301, the control operation at the time of reading data according to the first embodiment that has been described with reference to FIG. 4A or 4B.

The flowchart of FIG. 19 is different from the flowchart of FIG. 12 in that it includes Steps S1901, S1902, and S1903, which respectively correspond to Steps S1202, S1204, and S1208 of FIG. 12.

When the access controller 911 has determined in Step S1201 that the reading target data exists in the SCM SSD 102, the access controller 911 performs the process of Step S1901. In Step S1901, the access controller 911 issues a read request to the SCM I/O queue 913. Further, the access controller 911 calculates, according to the state of the SCM I/O queue 913, an estimated execution time $T_i$ that is load information using Formula 1 above. After that, the access controller 911 maintains the calculated load information in, for example, a memory (not illustrated) included in the server 103, which is different from Step S1202 of FIG. 12.

In Step S1902 of FIG. 19 corresponding to Step S1204 of FIG. 12 or in Step S1903 of FIG. 19 corresponding to Step S1208 of FIG. 12, the access controller 911 performs the following process. In order to determine whether the SCM SSD 102 is under a high load, the access controller 911 determines the load state of the SCM SSD 102 according to load information on the SCM SSD 102 that is maintained in the server 103, which is different from FIG. 12.

Figure 20:
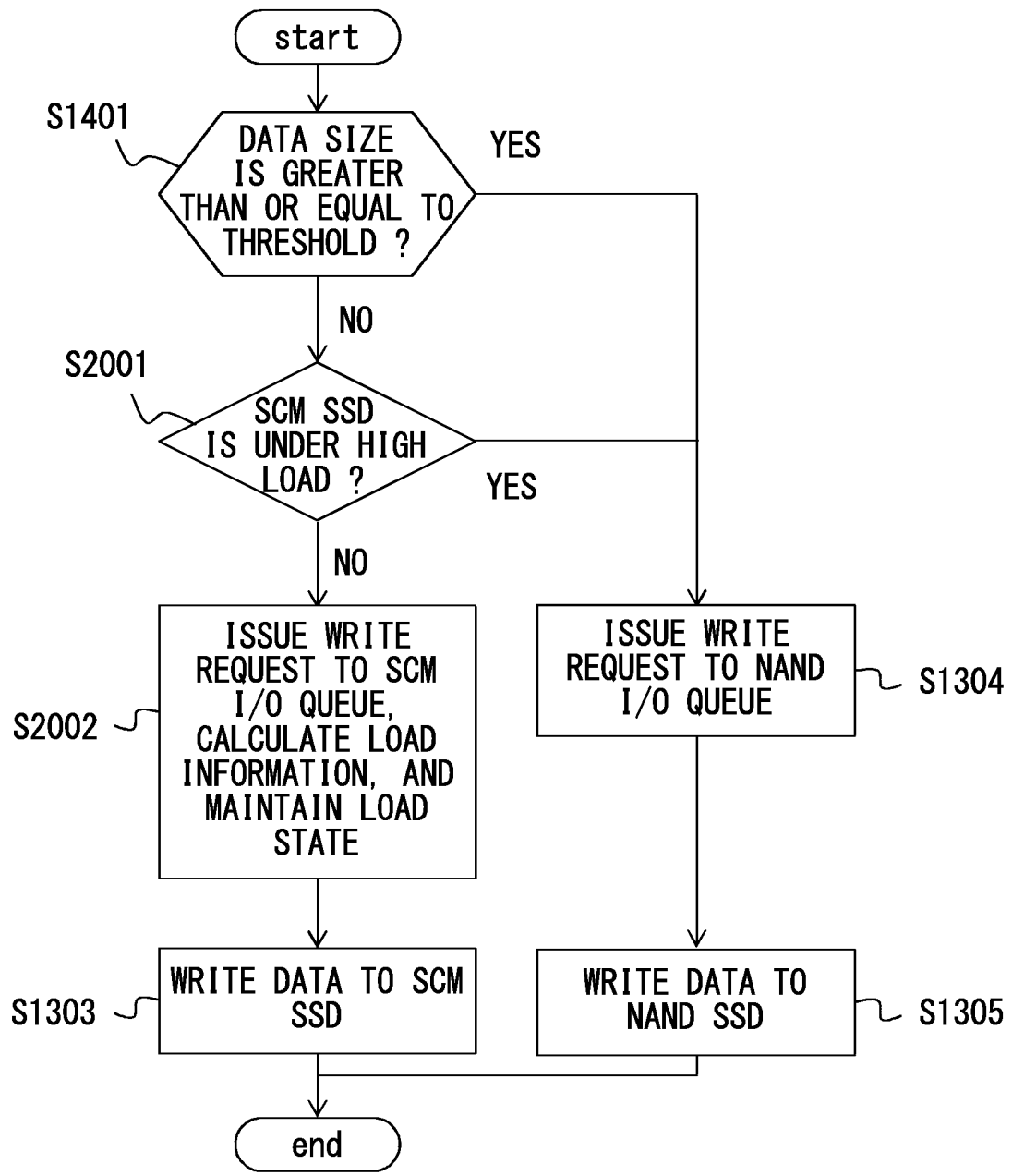
FIG. 20 is a flowchart that illustrates an example of a first control process at the time of writing data according to the third embodiment.

FIG. 20 is a flowchart that illustrates an example of a first control process performed by the access controller 911 at the time of writing data according to the third embodiment. The process of this flowchart corresponds to the above-described control process of FIG. 14 according to the first embodiment, and FIG. 20 has the same step numbers for the same steps as FIG. 14. In other words, in this control process, all of the servers 103 separately perform, without the master server 301, the second control operation at the time of writing data according to the first embodiment that has been described with reference to FIG. 5B.

The flowchart of FIG. 20 is different from the flowchart of FIG. 14 in that it includes Steps S2001 and S2002, which respectively correspond to Steps S1301 and S1302 of FIG. 14.

In Step S2001, in order to determine whether the SCM SSD 102 is under a high load, the access controller 911 determines the load state of the SCM SSD 102 according to load information on the SCM SSD 102 that is maintained in the server 103.

When the access controller 911 has determined in Step S2001 that the SCM SSD 102 is under a low load, the access controller 911 performs the following process in Step S2002. The access controller 911 issues a write request to the SCM I/O queue 913. Further, the access controller 911 calculates, according to the state of the SCM I/O queue 913, an estimated execution time $T_i$ that is load information using Formula 1 above. After that, the access controller 911 maintains the calculated load information in, for example, a memory (not illustrated) included in the server 103, which is different from Step S1302 of FIG. 14.

FIG. 21 is a flowchart that illustrates an example of a second control process performed by the access controller 911 at the time of writing data according to the third embodiment. The process of this flowchart corresponds to the above-described control process of FIG. 15 according to the second embodiment, and FIG. 21 has the same step numbers for the same steps as FIG. 15. In other words, in this control process, all of the servers 103 separately perform, without the master server 301, the control operation at the time of writing data according to the second embodiment that has been described with reference to FIG. 6.

The flowchart of FIG. 21 is different from the flowchart of FIG. 15 in that it includes Steps S2101 and S2102, which respectively correspond to Steps S1501 and S1502 of FIG. 15.

In Step S2101, in order to determine whether the SCM SSD 102 is under a high load, the access controller 911 determines the load state of the SCM SSD 102 according to load information on the SCM SSD 102 that is maintained in the server 103.

When the access controller 911 has determined in Step S2101 that the SCM SSD 102 is under a low load, the access controller 911 performs the following process in Step S2102. The access controller 911 issues a write request to both the NAND I/O queue 912 and the SCM I/O queue 913. Further, the access controller 911 calculates, according to the state of the SCM I/O queue 913, an estimated execution time $T_i$ that is load information using Formula 1 above. After that, the access controller 911 maintains the calculated load information in, for example, a memory (not illustrated) included in the server 103, which is different from Step S1502 of FIG. 15.

Figure 22:
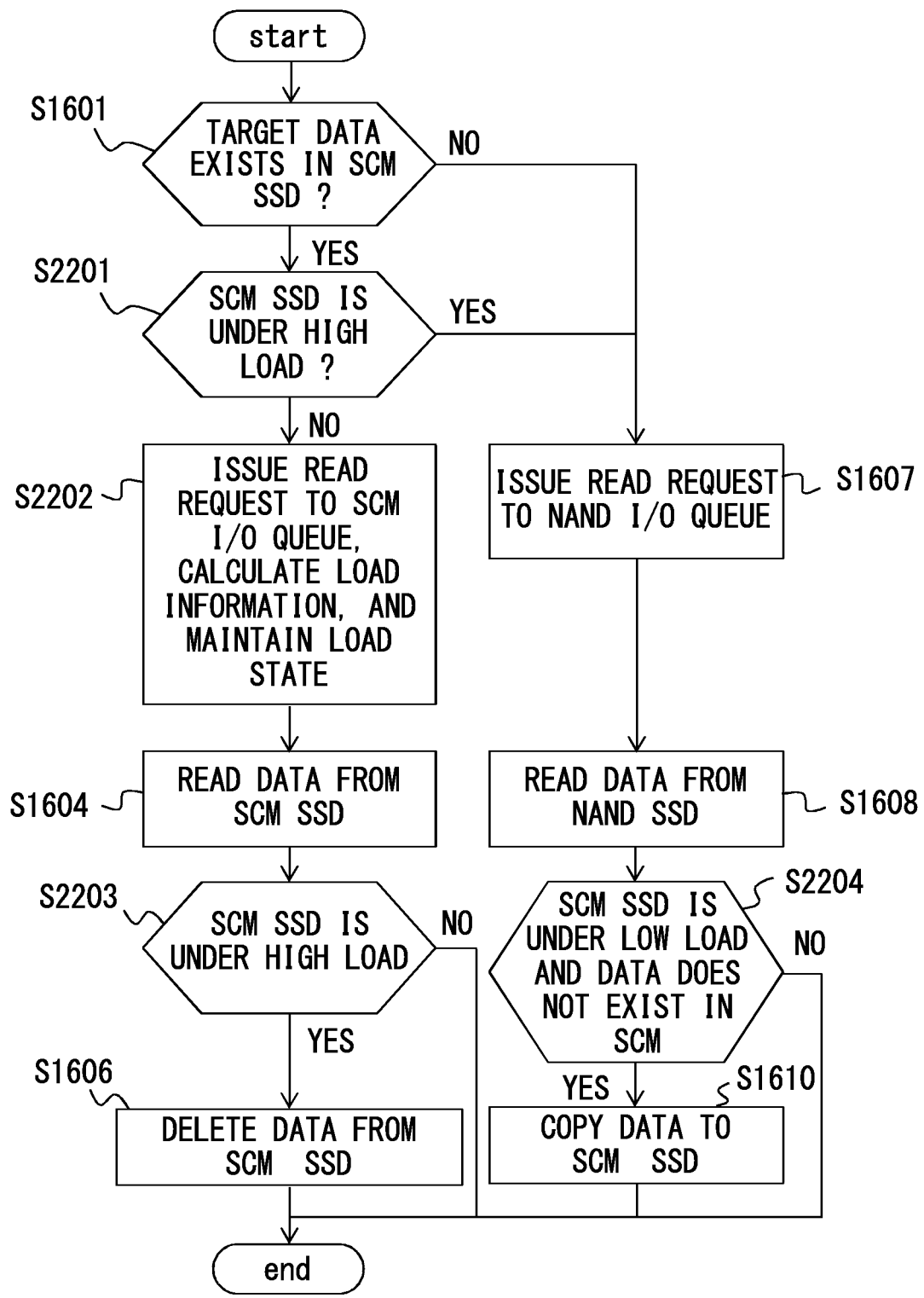
FIG. 22 is a flowchart that illustrates an example of a second control process at the time of reading data according to the third embodiment.

FIG. 22 is a flowchart that illustrates an example of a second control process performed by the access controller 911 at the time of reading data according to the third embodiment. The process of this flowchart corresponds to the above-described control process of FIG. 16 according to the second embodiment, and FIG. 22 has the same step numbers for the same steps as FIG. 16. In other words, in this control process, all of the servers 103 separately perform, without the master server 301, the first control operation at the time of reading data according to the second embodiment that has been described with reference to FIG. 6.

The flowchart of FIG. 22 is different from the flowchart of FIG. 16 in that it includes Steps S2201, S2202, S2203, and S2204, which respectively correspond to Steps S1602, S1603, S1605, and S1609 of FIG. 16.

In Step S2201, S2203, or S2204, the access controller 911 performs the following process. The access controller 911 determines the load state of the SCM SSD 102 according to load information on the SCM SSD 102 that is maintained in the server 103, which is different from FIG. 16.

When the access controller 911 has determined in Step S2201 that the SCM SSD 102 is under a low load, the access controller 911 performs the following process in Step S2202. The access controller 911 issues a read request to the SCM I/O queue 913. Further, the access controller 911 calculates, according to the state of the SCM I/O queue 913, an estimated execution time $T_i$ that is load information using Formula 1 above. After that, the access controller 911 maintains the calculated load information in, for example, a memory (not illustrated) included in the server 103, which is different from Step S1603 of FIG. 16.

Figure 23:
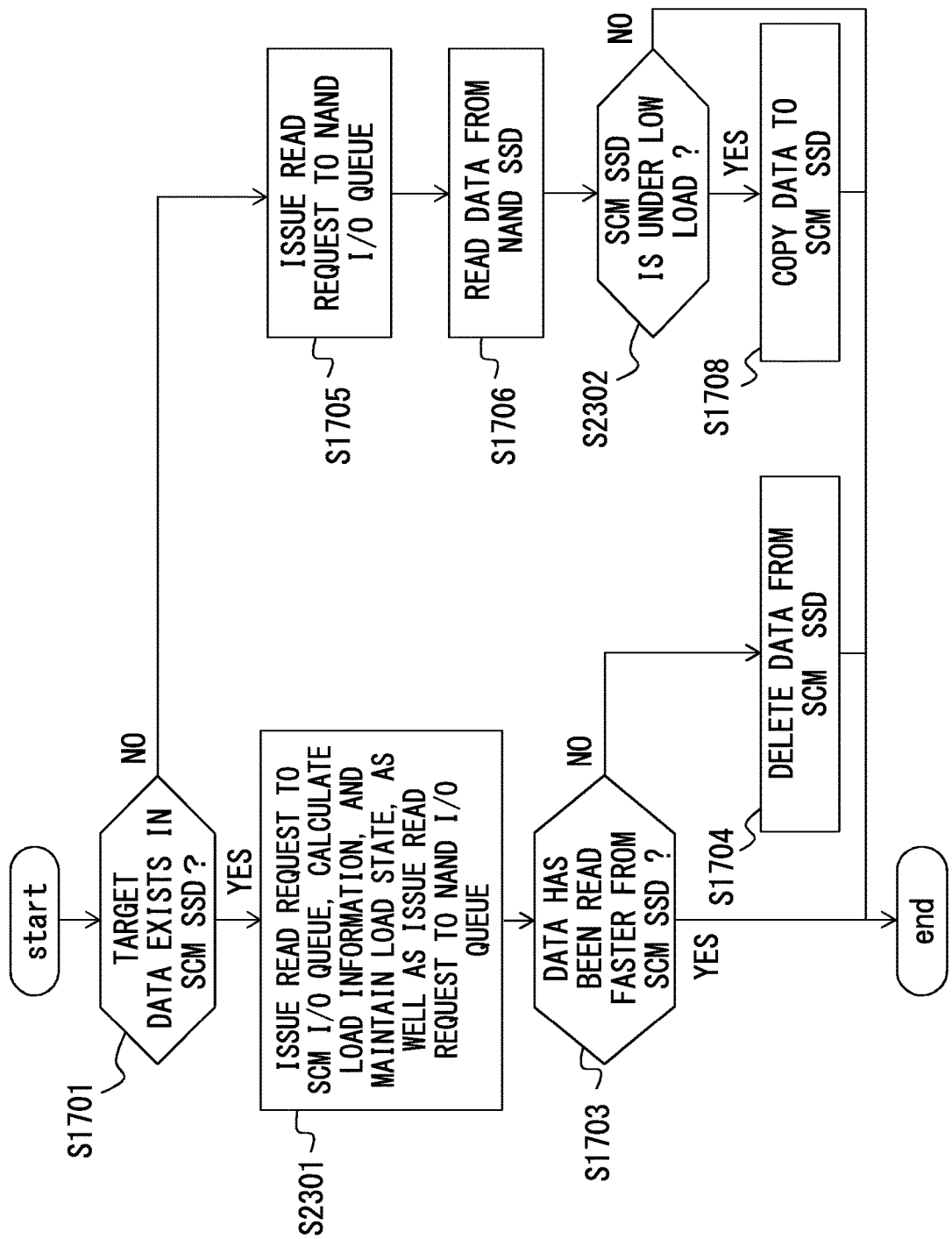
FIG. 23 is a flowchart that illustrates an example of a third control process at the time of reading data according to the third embodiment.

FIG. 23 is a flowchart that illustrates an example of a third control process performed by the access controller 911 at the time of reading data according to the third embodiment. The process of this flowchart corresponds to the above-described control process of FIG. 17 according to the second embodiment, and FIG. 23 has the same step numbers for the same steps as FIG. 17. In other words, in this control process, all of the servers 103 separately perform, without the master server 301, the second control operation at the time of reading data according to the second embodiment that has been described with reference to FIG. 6.

The flowchart of FIG. 23 is different from the flowchart of FIG. 17 in that it includes Steps S2301 and S2302, which respectively correspond to Steps S1702 and S1707 of FIG. 17.

When the access controller 911 has determined, in Step S1701, that the reading target data exists in the SCM SSD 102, the access controller 911 performs the process of Step S2301. In Step S2301, the access controller 911 issues a read request to the SCM I/O queue 913. Further, the access controller 911 calculates, according to the state of the SCM I/O queue 913, an estimated execution time $T_i$ that is load information using Formula 1 above. After that, the access controller 911 maintains the calculated load information in, for example, a memory (not illustrated) included in the server 103, which is different from Step S1702 of FIG. 17.

In Step S2302, the access controller 911 performs the following process. In order to determine whether the SCM SSD 102 is under a low load, the access controller 911 determines the load state of the SCM SSD 102 according to load information on the SCM SSD 102 that is maintained in the server 103, which is different from FIG. 17.

Figure 24:
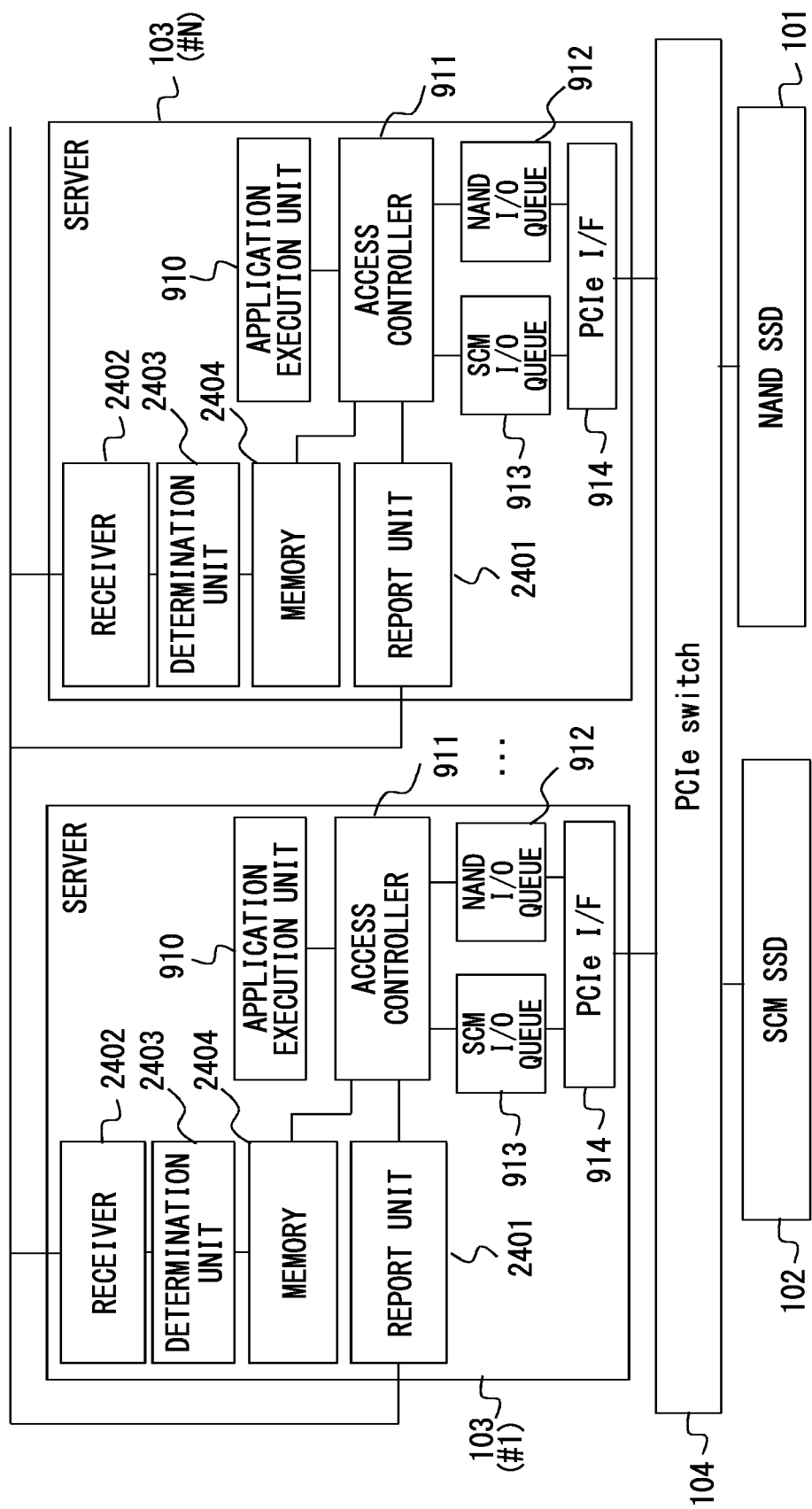
FIG. 24 illustrates an example of a system configuration of the fourth embodiment.

FIG. 24 illustrates an example of a system configuration of the fourth embodiment. As described with reference to FIG. 8, the configuration of the fourth embodiment is not provided with the master server 301, and the servers 103 #1-#N share load information on the SCM SSD 102 by communicating with one another.

Thus, in addition to the components included in the system configuration of the third embodiment illustrated in FIG. 18, each server 103 in the configuration of the fourth embodiment illustrated in FIG. 24 includes a load information report unit 2401, a load information receiver 2402, a load state determination unit 2403, and a load state memory 2404.

The access controller 911 determines a data-writing destination and transfers the data according to the load state of the SCM SSD 102. When the state of the SCM I/O queue 913 has been changed, the access controller 911 calculates load information and reports the load information to all of the servers 103 through the load information report unit 2401. The load state determination unit 2403 receives the load information on the SCM SSD 102 from each server 103 through the load information receiver 2402 so as to determine a load on the SCM SSD 102. The load state determination unit 2403 stores the load state that is a result of the load determination and the load information received from each server 103 in the load state memory 2404 in the same data format as the data format illustrated in FIG. 10.

When the access controller 911 determines the load state, the access controller 911 refers to the load state stored in the load state memory 2404.

Figure 25:
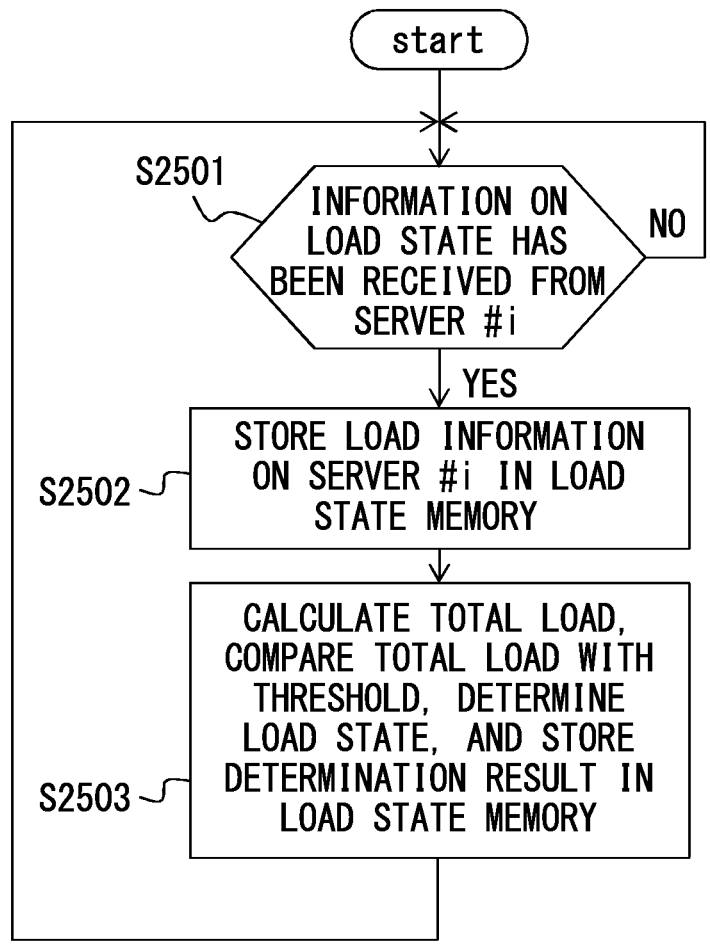
FIG. 25 is a flowchart that illustrates an example of a control process of receiving load information and updating a load state that is performed in each server according to the fourth embodiment.

FIG. 25 is a flowchart that illustrates an example of a control process of receiving load information and updating a load state that is performed in each serve 103 according to the fourth embodiment.

The load information receiver 2402 waits until the load information receiver 2402 receives an estimated execution time $T_i$, which is load information, from an arbitrary server 103 #i, including the server 103 of this load information receiver 2402 (a determination of "NO" is repeated in Step S2501).

When the load information receiver 2402 has received the load information (YES in Step S2501), the load information receiver 2402 stores the received estimated execution time $T_i$ in the load state memory 2404 in the data format illustrated in FIG. 10. The received estimated execution time $T_i$ is load information on the server 103 #i (Step S2502).

Next, the load state determination unit 2403 recalculates the total load in the load state memory 2404 (FIG. 10), compares the total load with a threshold, and determines a load state. Then, the load state determination unit 2403 stores the determined load state as a new load state in the load state memory 2404 in the data format illustrated in FIG. 10 (Step S2503). After that, the control process of receiving load information and updating a load state that is performed in each server 103 returns to the process of Step S2501 in which the load information receiver 2402 is in a standby state.

Figure 26:
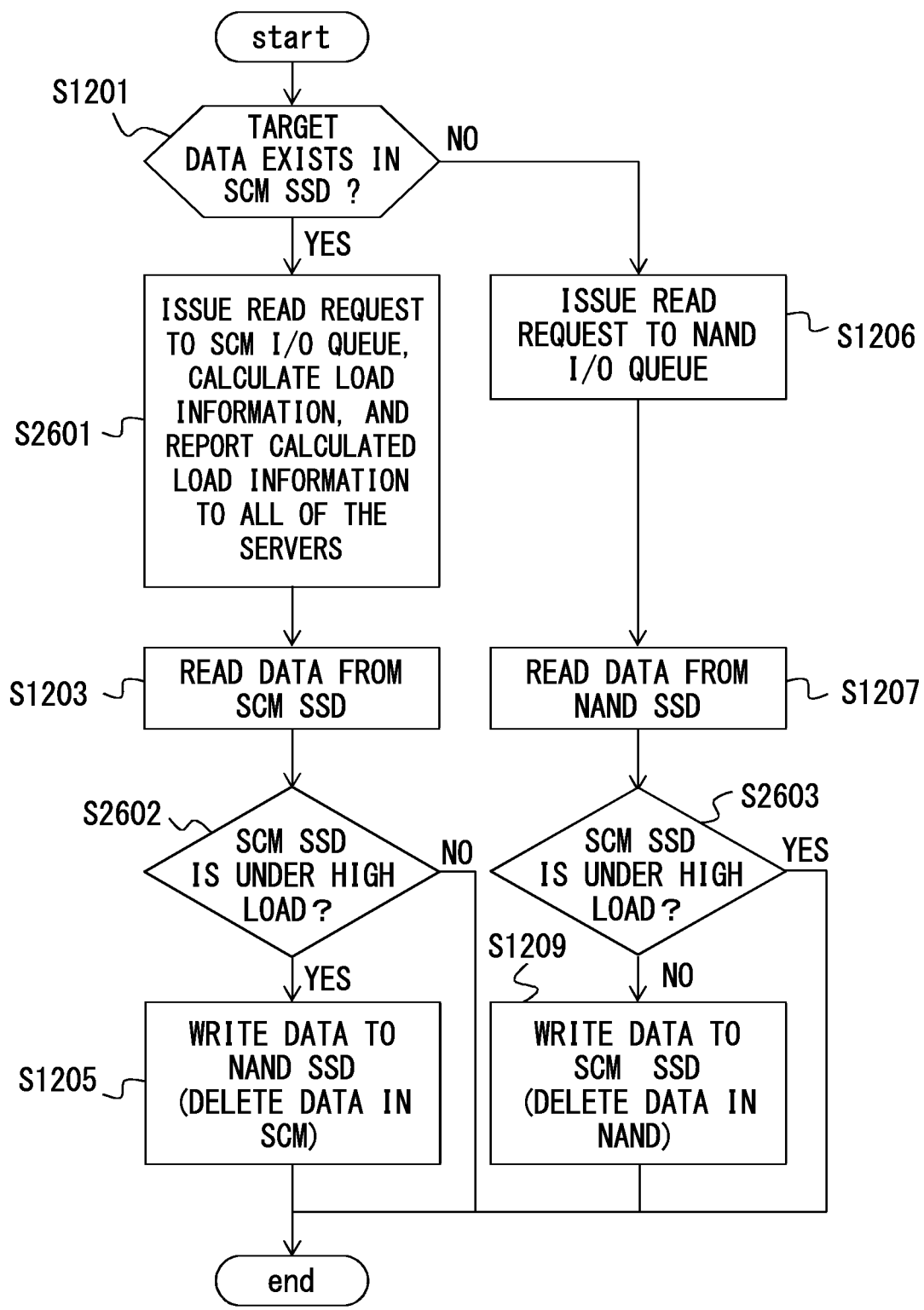
FIG. 26 is a flowchart that illustrates an example of a first control process at the time of reading data according to the fourth embodiment.

FIG. 26 is a flowchart that illustrates an example of a first control process performed by the access controller 911 at the time of reading data according to the fourth embodiment. The process of this flowchart corresponds to the above-described control process of FIG. 12 according to the first embodiment, and FIG. 26 has the same step numbers for the same steps as FIG. 12. In other words, in this control process, all of the servers 103 separately perform the control operation at the time of reading data according to the first embodiment that has been described with reference to FIG. 4A or 4B, while mutually communicating load information on the SCM SSD 102.

The flowchart of FIG. 26 is different from the flowchart of FIG. 12 in that it includes Steps S2601, S2602, and S2603, which respectively correspond to Steps S1202, S1204, and S1208 of FIG. 12.

When the access controller 911 has determined, in Step S1201, that the reading target data exists in the SCM SSD 102, the access controller 911 performs the process of Step S2601. In Step S2601, the access controller 911 issues a read request to the SCM I/O queue 913. Further, the access controller 911 calculates, according to the state of the SCM I/O queue 913, an estimated execution time $T_i$ that is load information using Formula 1 above. After that, the access controller 911 reports the calculated load information to all of the servers 103 through the load information report unit 2401 included in the server 103 illustrated in FIG. 24, which is different from Step S1202 of FIG. 12.

In Step S2602 or S2603, the access controller 911 performs the following process. In order to determine whether the SCM SSD 102 is under a high load, the access controller 911 determines the load state of the SCM SSD 102 according to load information on the SCM SSD 102 that is maintained in the load state memory 2404 included in the server 103, which is different from FIG. 12.

Figure 27:
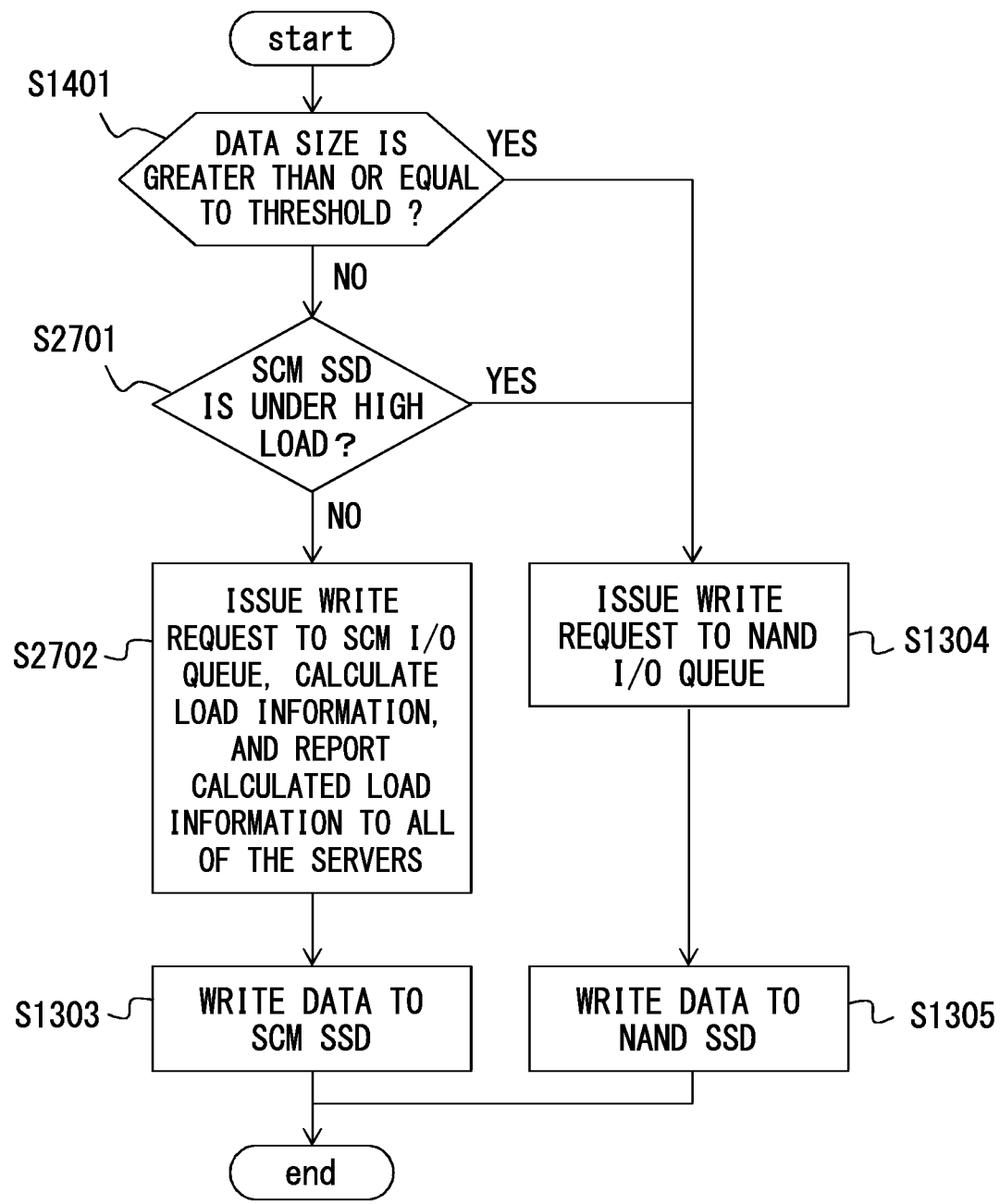
FIG. 27 is a flowchart that illustrates an example of a first control process at the time of writing data according to the fourth embodiment.

FIG. 27 is a flowchart that illustrates an example of a first control process performed by the access controller 911 at the time of writing data according to the fourth embodiment. The process of this flowchart corresponds to the above-described control process of FIG. 14 according to the first embodiment, and FIG. 27 has the same step numbers for the same steps as FIG. 14. In other words, in this control process, all of the servers 103 separately perform the second control operation at the time of writing data according to the first embodiment that has been described with reference to FIG. 5B, while mutually communicating load information on the SCM SSD 102.

The flowchart of FIG. 27 is different from the flowchart of FIG. 14 in that it includes Steps S2701 and S2702 that respectively correspond to Steps S1301 and S1302 of FIG. 14.

In Step S2701, in order to determine whether the SCM SSD 102 is under a high load, the access controller 911 determines the load state of the SCM SSD 102 according to load information on the SCM SSD 102 that is maintained in the load state memory 2404 included in the server 103.

When the access controller 911 has determined in Step S2701 that the SCM SSD 102 is under a low load, the access controller 911 performs the following process in Step S2702. The access controller 911 issues a write request to the SCM I/O queue 913. Further, the access controller 911 calculates, according to the state of the SCM I/O queue 913, an estimated execution time $T_i$ that is load information using Formula 1 above. After that, the access controller 911 reports the calculated load information to all of the servers 103 through the load information report unit 2401 illustrated in FIG. 24, which is different from Step S1302 of FIG. 14.

Figure 28:
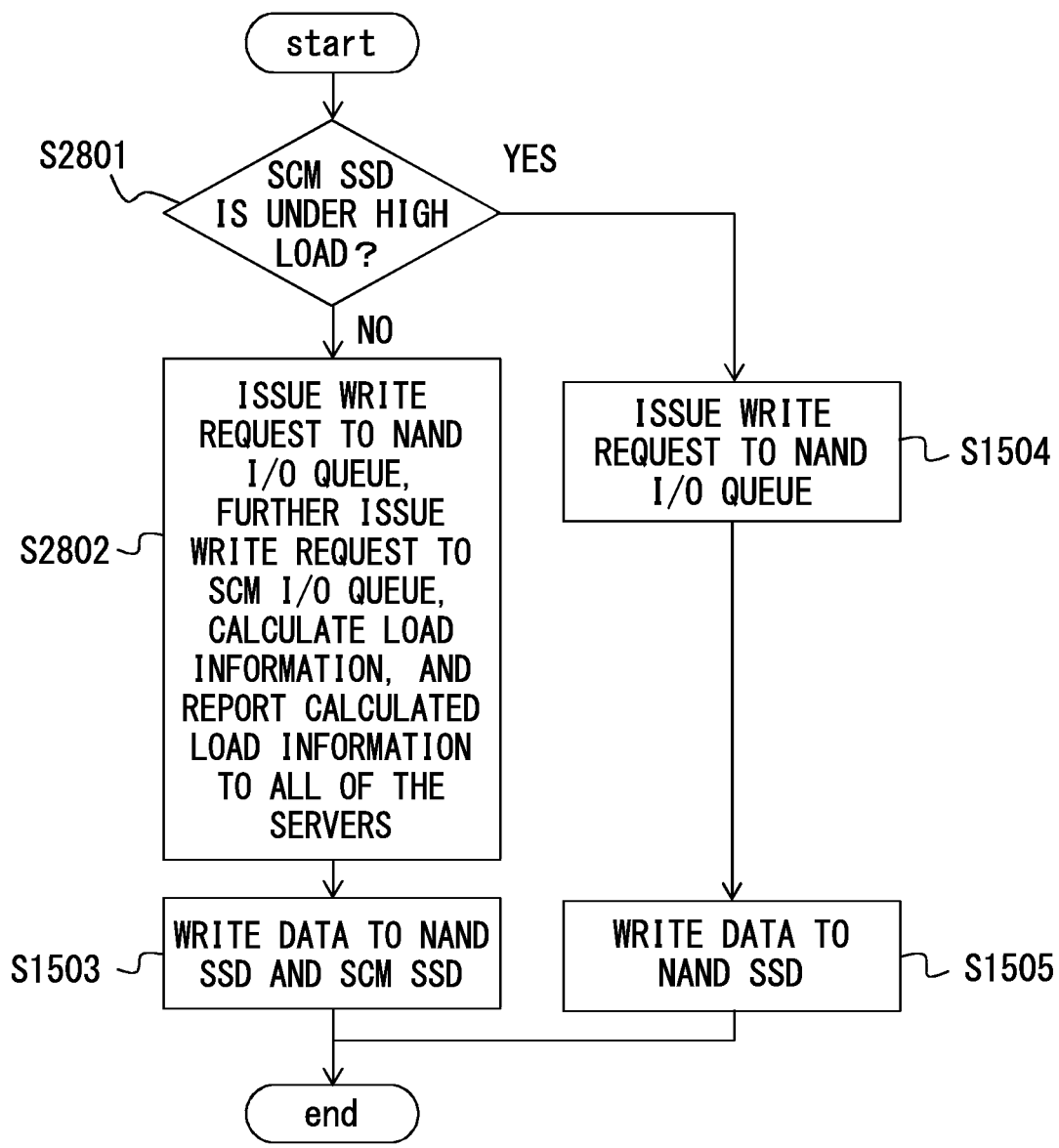
FIG. 28 is a flowchart that illustrates an example of a second control process at the time of writing data according to the fourth embodiment.

FIG. 28 is a flowchart that illustrates an example of a second control process performed by the access controller 911 at the time of writing data according to the fourth embodiment. The process of this flowchart corresponds to the above-described control process of FIG. 15 according to the second embodiment, and FIG. 28 has the same step numbers for the same steps as FIG. 15. In other words, in this control process, all of the servers 103 separately perform the control operation at the time of writing data according to the second embodiment that has been described with reference to FIG. 6, while mutually communicating load information on the SCM SSD 102.

The flowchart of FIG. 28 is different from the flowchart of FIG. 15 in that it includes Steps S2801 and S2802 that respectively correspond to Steps S1501 and S1502 of FIG. 15.

In Step S2801, in order to determine whether the SCM SSD 102 is under a high load, the access controller 911 determines the load state of the SCM SSD 102 according to load information on the SCM SSD 102 that is maintained in the load state memory 2404 included in the server 103.

When the access controller 911 has determined in Step S2801 that the SCM SSD 102 is under a low load, the access controller 911 performs the following process in Step S2802. The access controller 911 issues a write request to both the NAND I/O queue 912 and the SCM I/O queue 913. Further, the access controller 911 calculates, according to the state of the SCM I/O queue 913, an estimated execution time $T_i$ that is load information using Formula 1 above. After that, the access controller 911 reports the calculated load information to all of the servers 103 through the load information report unit 2401 illustrated in FIG. 24, which is different from Step S1502 of FIG. 15.

Figure 29:
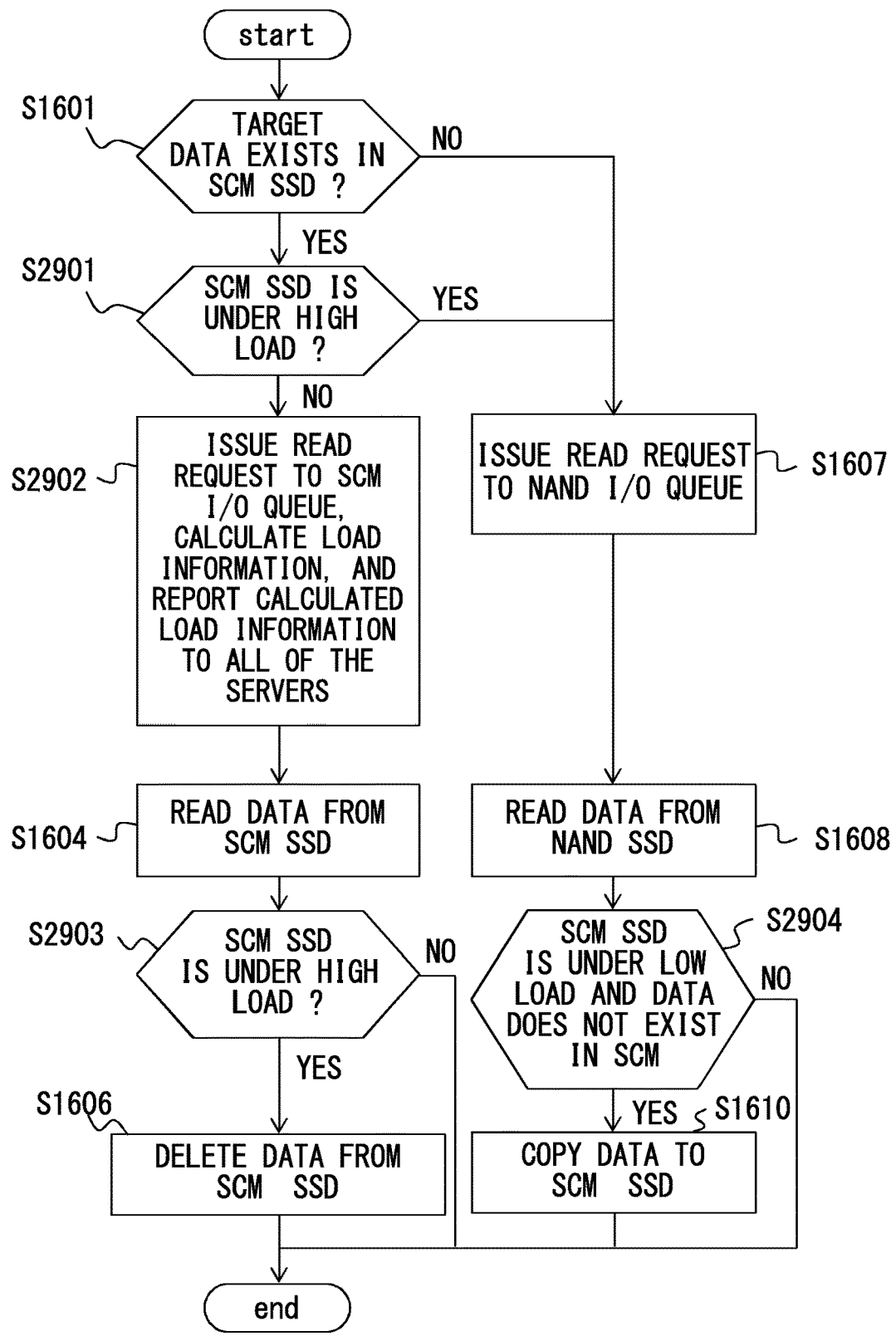
FIG. 29 is a flowchart that illustrates an example of a second control process at the time of reading data according to the fourth embodiment.

FIG. 29 is a flowchart that illustrates an example of a second control process performed by the access controller 911 at the time of reading data according to the fourth embodiment. The process of this flowchart corresponds to the above-described control process of FIG. 16 according to the second embodiment, and FIG. 29 has the same step numbers for the same steps as FIG. 16. In other words, in this control process, all of the servers 103 separately perform the first control operation at the time of reading data according to the second embodiment that has been described with reference to FIG. 6, while mutually communicating load information on the SCM SSD 102.

The flowchart of FIG. 29 is different from the flowchart of FIG. 16 in that it includes Steps S2901, S2902, S2903, and S2904, which respectively correspond to Steps S1602, S1603, S1605, and S1609 of FIG. 16.

In Step S2901, S2903 or S2904, the access controller 911 performs the following process. The access controller 911 determines the load state of the SCM SSD 102 according to load information on the SCM SSD 102 that is maintained in the load state memory 2404 included in the server 103, which is different from FIG. 16.

When the access controller 911 has determined in Step S2901 that the SCM SSD 102 is under a low load, the access controller 911 performs the following process in Step S2902. The access controller 911 issues a read request to the SCM I/O queue 913. Further, the access controller 911 calculates, according to the state of the SCM I/O queue 913, an estimated execution time $T_i$ that is load information using Formula 1 above. After that, the access controller 911 reports the calculated load information to all of the servers 103 through the load information report unit 2401 illustrated in FIG. 24, which is different from Step S1603 of FIG. 16.

Figure 30:
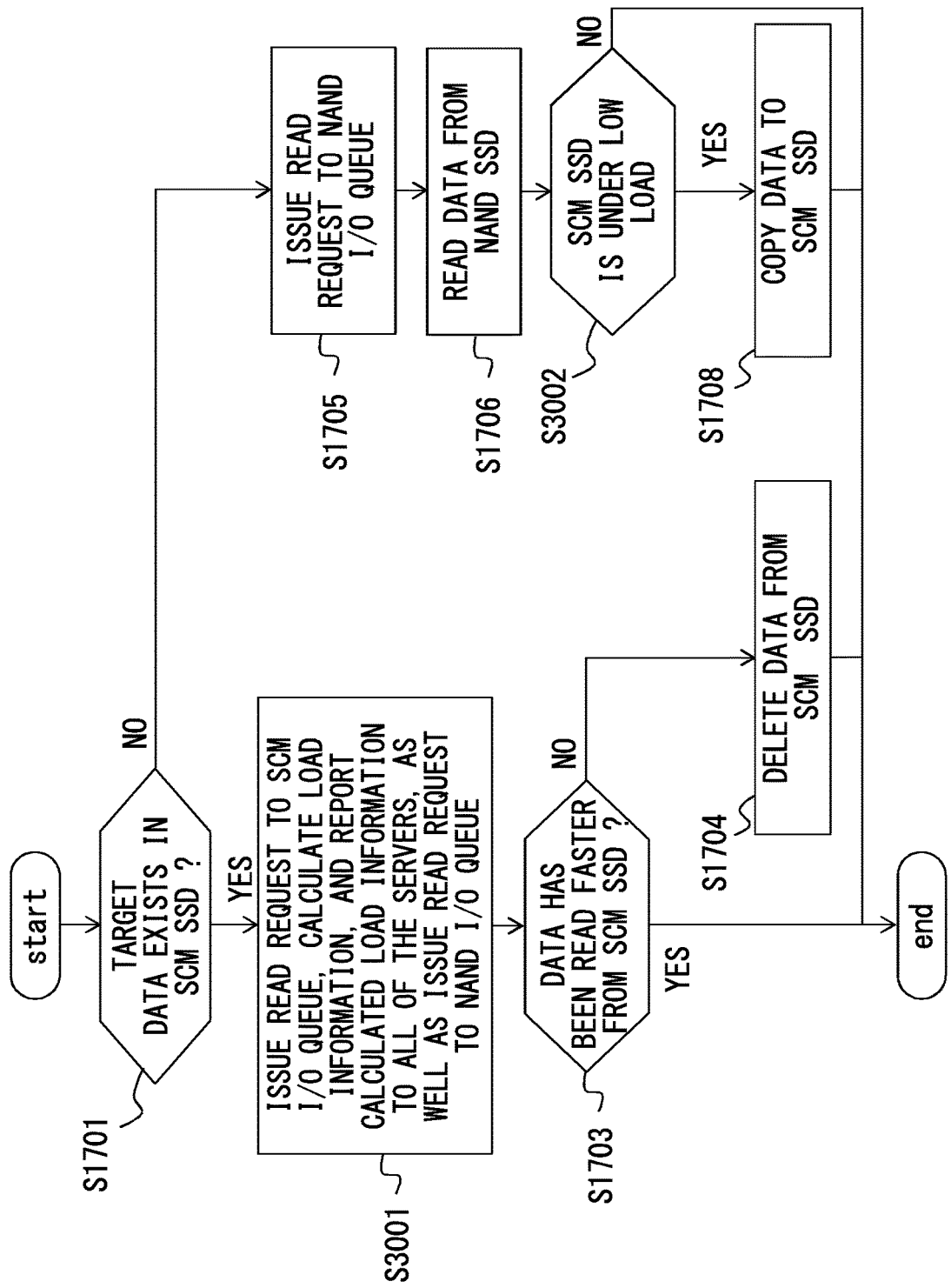
FIG. 30 is a flowchart that illustrates an example of a third control process at the time of reading data according to the fourth embodiment.

FIG. 30 is a flowchart that illustrates an example of a third control process performed by the access controller 911 at the time of reading data according to the fourth embodiment. The process of this flowchart corresponds to the above-described control process of FIG. 17 according to the second embodiment, and FIG. 30 has the same step numbers for the same steps as FIG. 17. In other words, in this control process, all of the servers 103 separately perform the second control operation at the time of reading data according to the second embodiment that has been described with reference to FIG. 6, while mutually communicating load information on the SCM SSD 102.

The flowchart of FIG. 30 is different from the flowchart of FIG. 17 in that it includes Steps S3001 and S3002, which respectively correspond to Steps S1702 and S1707 of FIG. 17.

When the access controller 911 has determined, in Step S1701, that the reading target data exists in the SCM SSD 102, the access controller 911 performs the process of Step S3001. In Step S3001, the access controller 911 issues a read request to the SCM I/O queue 913. Further, the access controller 911 calculates, according to the state of the SCM I/O queue 913, an estimated execution time $T_i$ that is load information using Formula 1 above. After that, the access controller 911 reports the calculated load information to all of the servers 103 through the load information report unit 2401 illustrated in FIG. 24, which is different from Step S1702 of FIG. 17.

In Step S3002, the access controller 911 performs the following process. In order to determine whether the SCM SSD 102 is under a low load, the access controller 911 determines the load state of the SCM SSD 102 according to load information on the SCM SSD 102 that is maintained in the load state memory 2404 included in the server 103, which is different from FIG. 17.

Figure 31:
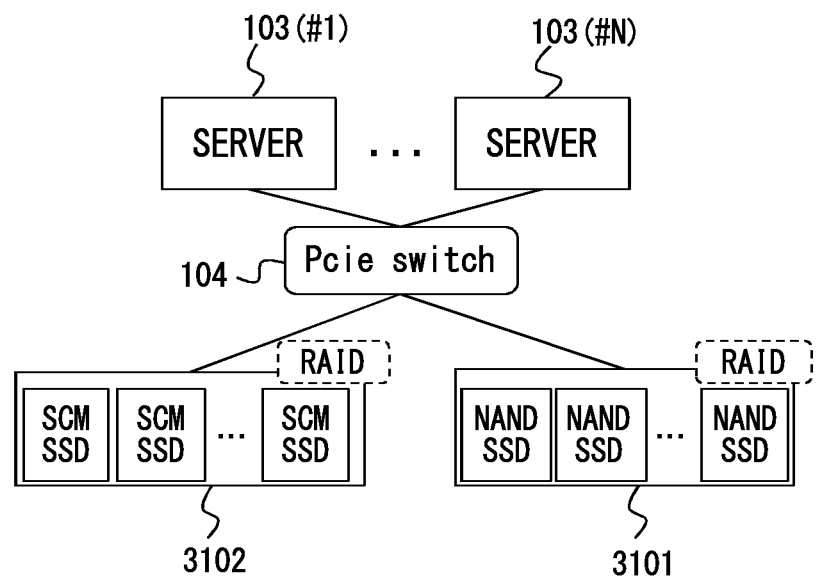
FIG. 31 illustrates an example of a configuration in which a RAID is configured by a plurality of SSDs in the embodiments.

FIG. 31 illustrates an example of a configuration in which a RAID is configured by a plurality of SSDs in the embodiments above. In the embodiments above, the configuration in which one NAND SSD 101 and one SCM SSD 102 are implemented has been described with reference to FIGS. 1, 3A, 7, 8, 9, 18, and 24, but the embodiment is not limited to this configuration. A configuration with a RAID (redundant array of independent disks) structure illustrated in FIG. 31 is also acceptable as an embodiment of the present invention. In this case, a plurality of NAND SSDs configure a RAID, which makes them look, from each server 103, as if they were operating as one NAND SSD 3101. Likewise, a plurality of SCM SSDs configure a RAID, which makes them look, from each server 103, as if they were operating as one SCM SSD 3102.

MRAM, ReRAM, PCM, 3D XPoint, or NRAM may be used as an SCM SSD. 3D NAND, TLC, or NLC may be used as a NAND SSD.

The embodiments are not limited to the combination of an SCM SSD and a NAND SSD, but any combination of different types of semiconductor storage devices of different access speeds is acceptable.

Figure 32:
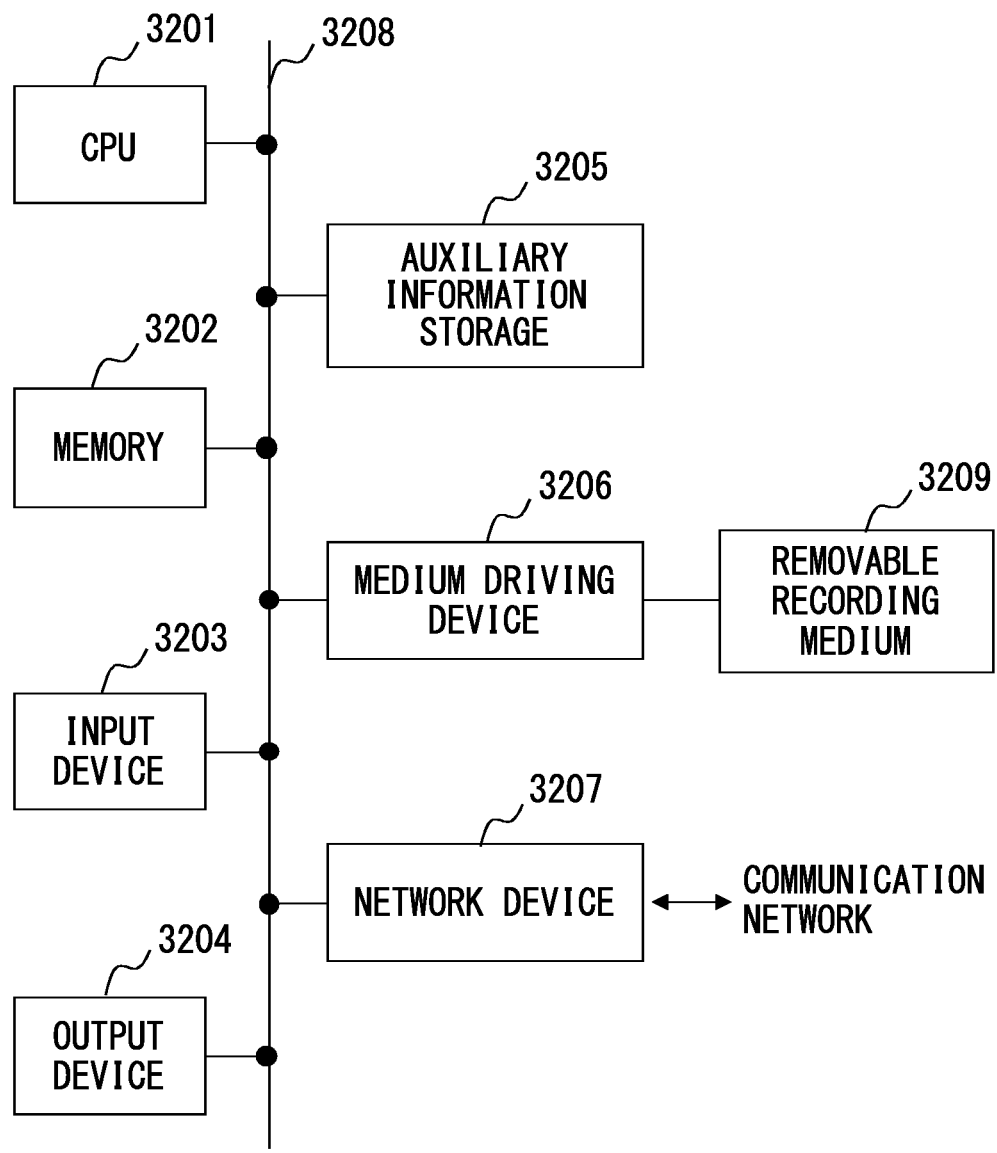
FIG. 32 illustrates an example of a hardware configuration of a computer.

FIG. 32 illustrates an example of a hardware configuration of a computer that can be implemented as an information processing apparatus to perform a software process according to each of the embodiments above. The computer illustrated in FIG. 32 includes a central processing unit (CPU) 3201, a memory 3202, an input device 3203, an output device 3204, an auxiliary information storage 3205, a medium driving device 3206 into which a removable recording medium 3209 is inserted, and a network device 3207. These components are connected to one another via a bus 3208. The configuration illustrated in FIG. 32 is just an example of a computer that can be implemented as an information processing apparatus, and such a computer is not limited to this configuration.

The memory 3202 is, for example, a semiconductor memory such as a read only memory (ROM), a random access memory (RAM), or a flash memory, and stores therein a program and data that are used to perform processes.

The CPU (a processor) 3201 may execute a program by use of the memory 3202 so as to operate as the processing components included in the server 103 and the master server 301, such as the components 901 to 904, 910 to 913, 915, 916, and 2401 to 2404 illustrated in FIGS. 9, 18, and 24.

The input device 3203 is, for example, a keyboard or a pointing device, and is used to input instructions or information from an operator or a user. The output device 3204 is, for example, a display, a printer, or a speaker, and is used to output inquiries to the operator or the user or to output a processing result.

The auxiliary information storage 3205 is, for example, a hard disk storage, a magnetic disk storage, an optical disk device, a magneto-optical disk device, a tape device, or a semiconductor storage. In the information processing apparatus of each of the embodiments above, a program and data are stored in the auxiliary information storage 3205, and they can be used by being loaded into the memory 3202.

The medium driving device 3206 drives a removable recording medium 3209 so as to access a recorded content. The removable recording medium 3209 is, for example, a memory device, a flexible disk, an optical disk, or a magneto-optical disk. The removable recording medium 3209 may be, for example, a compact disk read only memory (CD-ROM), a digital versatile disk (DVD), or a universal serial bus (USB) memory. The operator or the user stores a program and data in the removable recording medium 3209, and can use them by loading them into the memory 3202.

As described above, a computer-readable recording medium that stores therein a program and data used when processes are performed in the information processing apparatus of each of the embodiments above is a physical (non-transitory) recording medium such as the memory 3202, the auxiliary information storage 3205, and the removable recording medium 3209.

The network device 3207 is a communication interface that is connected to a communication network such as a local area network (LAN) and that makes a data conversion associated with communication. The network device 3207 operates as some of the processing components included in the server 103 and the master server 301, such as the components 903, 904, 915, 916, 2401, and 2402 illustrated in FIGS. 9, 18, and 24. In the information processing apparatus of each of the embodiments above, a program and data are received from an external device via the network device 3207, and they can be used by being loaded into the memory 3202.

The information processing apparatus of each of the embodiments does not necessarily include all of the components in FIG. 32, and some of the components can be omitted according to the applications or the requirements. For example, when the instructions or the information from the operator or the user are not to be input, the input device 3203 may be omitted. When the removable recording medium 3209 or the communication network is not used, the medium driving device 3206 or the network device 3207 may be omitted.

The disclosed embodiments and the advantages of the embodiments have been described in detail, but various modifications, alterations, and omissions may be made without departing from the scope of the invention specified in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus that accesses a first storage device and a second storage device, the information processing apparatus comprising:
   a memory which stores information relating to a request from the information processing apparatus to the second storage device; and
   a processor, connected to the memory, which determines a load on the second storage device based on the information relating to the request, wherein
   when the information processing apparatus reads data in the second storage device and the load on the second storage device is greater than a first threshold, the processor transfers the data read from the second storage device to the first storage device which has an access speed slower than the second storage device,
   when the information processing apparatus reads data in the first storage device and the load on the second storage device which has an access speed faster than the first storage device is less than a second threshold, the processor transfers the data read from the first storage device to the second storage device,
   when a size of data to be written to the first storage device or the second storage device is greater than a third threshold, the processor writes the data to the first storage device,
   when the size of the data is less than the third threshold and the load on the second storage device is less than a fourth threshold, the processor writes the data to the second storage device, and
   when the size of the data is less than the third threshold and the load on the second storage device is greater than the fourth threshold, the processor writes the data to the first storage device.

2. The information processing apparatus according to claim 1, wherein
   when the load on the second storage device is less than a third threshold, the processor writes, to the second storage device, data to be written to the first storage device or the second storage device, and
   when the load on the second storage device is greater than the third threshold, the processor writes the data to the first storage device.

3. The information processing apparatus according to claim 1, wherein the information processing apparatus includes a server configured to access the first storage device and the second storage device and a master server in which the memory is implemented.

4. The information processing apparatus according to claim 1, wherein the information processing apparatus includes a server in which the memory and the processor are implemented.

5. The information processing apparatus according to claim 4, wherein the server shares the information relating to the request with another server in another information processing apparatus.

6. An information processing apparatus that accesses a first storage device and a second storage device, an access speed of the second storage device being higher than an access speed of the first storage device, the information processing apparatus comprising:
   a memory which stores information relating to a request from the information processing apparatus to the second storage device; and
   a processor, connected to the memory, which determines a load on the second storage device based on the information relating to the request, wherein
   when the load on the second storage device is less than a first threshold, the processor writes given data to both the first storage device and the second storage device, and
   when the load on the second storage device is greater than the first threshold, the processor writes the data only to the first storage device.

7. The information processing apparatus according to claim 6, wherein
   when specified data is stored in both the first storage device and the second storage device and the load on the second storage device is less than a second threshold, the processor reads the data from the second storage device, and
   when the specified data is stored in both the first storage device and the second storage device and the load on the second storage device is greater than the second threshold, the processor reads the data from the first storage device.

8. The information processing apparatus according to claim 6, wherein when specified data is stored in both the first storage device and the second storage device, the processor reads the data from both the first storage device and the second storage device, and the processor deletes the data from the second storage device when the data has been read faster from the first storage device than the second storage device.

9. The information processing apparatus according to claim 6, wherein when specified data is stored only in the first storage device and the load on the second storage device is less than a second threshold, the processor reads the data from the first storage device and copies the data read from the first storage device to the second storage device.

10. The information processing apparatus according to claim 6, wherein the information processing apparatus includes a server configured to access the first storage device and the second storage device and a master server in which the memory is implemented.

11. The information processing apparatus according to claim 6, wherein the information processing apparatus includes a server in which the memory and the processor are implemented.

12. The information processing apparatus according to claim 11, wherein the server shares the information relating to the request with another server in another information processing apparatus.

13. An information processing method that accesses a first storage device and a second storage device, the information processing method comprising:

controlling access to the first storage device and the second storage device according to a load on the second storage device that is determined based on information relating to a request to the second storage device which has an access speed faster than the first storage device, including when data in the second storage device is read and the load on the second storage device is greater than a first threshold, transferring the data read from the second storage device to the first storage device, when data in the first storage device is read and the load on the second storage device which has the access speed faster than the first storage device is less than a second threshold, transferring the data read from the first storage device to the second storage device, when a size of data to be written to the first storage device or the second storage device is greater than a third threshold, writing the data to the first storage device, when the size of the data is less than the third threshold and the load on the second storage device is less than a fourth threshold, writing the data to the second storage device, and when the size of the data is less than the third threshold and the load on the second storage device is greater than the fourth threshold, writing the data to the first storage device.

14. A non-transitory computer-readable recording medium having stored therein a program for causing a computer to execute a process to access a first storage device and a second storage device, the process comprising:

controlling access to the first storage device and the second storage device according to a load on the second storage device that is determined based on information relating to a request to the second storage device which has an access speed faster than the first storage device, including when data in the second storage device is read and the load on the second storage device is greater than a first threshold, transferring the data read from the second storage device to the first storage device, when data in the first storage device is read and the load on the second storage device which has the access speed faster than the first storage device is less than a second threshold, transferring the data read from the first storage device to the second storage device, when a size of data to be written to the first storage device or the second storage device is greater than a third threshold, writing the data to the first storage device, when the size of the data is less than the third threshold and the load on the second storage device is less than a fourth threshold, writing the data to the second storage device, and when the size of the data is less than the third threshold and the load on the second storage device is greater than the fourth threshold, writing the data to the first storage device.

* * * * *